US008855282B2

(12) United States Patent
Wu et al.

(10) Patent No.: US 8,855,282 B2
(45) Date of Patent: Oct. 7, 2014

(54) METHOD, SYSTEM AND APPARATUS FOR IMPLEMENTING MULTIMEDIA RING BACK TONE SERVICE

(75) Inventors: Lingyan Wu, Nanjing (CN); Yuan Bao, Shenzhen (CN); Guojun Xu, Nanjing (CN); Haoyu Wang, Nanjing (CN); Shanyang Ke, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/619,367

(22) Filed: Sep. 14, 2012

(65) Prior Publication Data

US 2013/0259220 A1 Oct. 3, 2013

Related U.S. Application Data

(63) Continuation of application No. 12/647,270, filed on Dec. 24, 2009, now Pat. No. 8,351,585, which is a continuation of application No. PCT/CN2008/071550, filed on Jul. 4, 2008.

(30) Foreign Application Priority Data

Oct. 13, 2007 (CN) .......................... 2007 1 0182250
Mar. 31, 2008 (CN) .......................... 2008 1 0090251
Jul. 4, 2008 (CN) .......................... 2007 1 0076368

(51) Int. Cl.
*H04M 3/42* (2006.01)
*H04M 7/00* (2006.01)
*H04M 7/12* (2006.01)

(52) U.S. Cl.
CPC .......... *H04M 7/129* (2013.01); *H04M 3/42059* (2013.01); *H04M 3/42102* (2013.01); *H04M 2201/16* (2013.01); *H04M 3/42017* (2013.01)
USPC ................... 379/201.01; 379/87; 379/201.02; 379/207.02; 379/207.16; 379/221.08; 379/221.09; 379/221.11; 379/221.12; 379/257; 379/373.02; 455/414.1

(58) Field of Classification Search
USPC .................... 379/87, 201.01, 201.02, 207.02, 379/207.16, 221.08, 221.09, 221.11, 379/221.12, 257, 373.02, 376.01; 455/414.1
See application file for complete search history.

(56) References Cited

U.S. PATENT DOCUMENTS 8,351,585 B2 1/2013 Wu et al.
2004/0174983 A1 9/2004 Olschwang et al.
(Continued)

FOREIGN PATENT DOCUMENTS

CN 1520211 8/2004
CN 1681282 10/2005
(Continued)

OTHER PUBLICATIONS

Zhangiang et al. "RBT with Early Session" 3$^{rd}$ Generation Partnership Project 2. Jun. 18, 2007.
Valerius, Lee et al. "Ring Back Tone Call Flow" 3$^{rd}$ Generation Partnership Project 2.
(Continued)

*Primary Examiner* — Harry S Hong
(74) *Attorney, Agent, or Firm* — Brinks Gilson & Lione

(57) ABSTRACT

A method, system and apparatus for implementing a Multimedia Ring Back Tone (MRBT) service are provided. The method includes: receiving a call request originated by a calling terminal; parsing a tone playing policy specifying whether to play a caller tone or a callee tone or whether to filter a tone; performing caller tone media negotiation or callee tone media negotiation, or performing no tone negotiation according to the parsing result; and playing the caller tone or the callee tone to the caller, or playing no tone. With the technical solution of the present invention, the caller tone service can be implemented in the IMS domain. Whether a caller tone or a callee tone is played to the caller is determined according to a preset policy. Furthermore, the tone filtering service is also implemented. This gives a user freedom in experiencing the MRBT service.

15 Claims, 23 Drawing Sheets

(56) References Cited

U.S. PATENT DOCUMENTS

| | | |
|---|---|---|
| 2006/0126815 A1 | 6/2006 | Hahm et al. |
| 2006/0153355 A1 | 7/2006 | Wang et al. |
| 2006/0245571 A1 | 11/2006 | Radziewicz et al. |
| 2007/0121657 A1 | 5/2007 | Boillot et al. |
| 2007/0127642 A1 | 6/2007 | Bae et al. |
| 2007/0286401 A1 | 12/2007 | Siddiqui et al. |

FOREIGN PATENT DOCUMENTS

| | | |
|---|---|---|
| CN | 1697468 A | 11/2005 |
| CN | 1744629 A | 3/2006 |
| CN | 1816077 A | 8/2006 |
| CN | 1825871 A | 8/2006 |
| CN | 1852360 A | 10/2006 |
| CN | 1889604 A | 1/2007 |
| CN | 1972340 A | 5/2007 |
| CN | 1980278 A | 6/2007 |
| CN | 1980287 | 6/2007 |
| CN | 1988691 | 6/2007 |
| CN | 1992755 | 7/2007 |
| CN | 101409952 A | 4/2009 |
| EP | 1696645 A1 | 8/2006 |
| WO | 2004/016021 | 2/2004 |
| WO | WO 2005/043926 A2 | 5/2005 |
| WO | WO 2007/063058 A1 | 6/2007 |

OTHER PUBLICATIONS

Mahendran, AC et al. "Customized Ring Back Tone (CRBT) Call Flows." 3$^{rd}$ Generation Partnership Project 2. May 2007.

Supplementary Search Report issued in corresponding European Patent Application No. 08 77 3108; issued Aug. 19, 2010.

Written Opinion of the International Searching Authority issued in corresponding PCT Application No. PCT/CN2008/071550; mailed Oct. 9, 2008.

Office Action issued in corresponding Chinese Patent Application No. 200810090251.8, mailed Aug. 18, 2011.

Extended European Search Report issued in corresponding European Patent Application No. 11193894.0, mailed May 9, 2012.

Search Report issued in corresponding PCT Application No. PCT/CN2008/071550; mailed Oct. 9, 2008.

Office Action issued in corresponding Chinese Patent Application No. 200810090251.8, mailed May 18, 2012.

Office Action issued in corresponding Chinese Patent Application No. 200810090251.8, mailed Dec. 12, 2012.

Office Action issued in commonly owned U.S. Appl. No. 13/619,186, mailed Aug. 6, 2013, 8 pages.

Office Action issued in commonly owned U.S. Appl. No. 13/619,229, mailed Aug. 6, 2013, 8 pages.

Office Action issued in corresponding Chinese Patent Application No. 200810090251.8, mailed May 9, 2013, 10 pages.

Chinese Patent No. 101340629, issued on Oct. 9, 2013, granted in corresponding Chinese Patent Application No. 200810090251.8, 44 pages.

METHOD, SYSTEM AND APPARATUS FOR IMPLEMENTING MULTIMEDIA RING BACK TONE SERVICE

CROSS-REFERENCE TO RELATED APPLICATIONS

This application is a continuation of U.S. patent Ser. No. 12/647,270, filed on Dec. 24, 2009, which is a continuation of International Application No. PCT/CN2008/071550, filed on Jul. 4, 2008. The International Application claims priority to Chinese Patent Application No. 200710076368.6, filed on Jul. 4, 2007, Chinese Patent Application No. 200710182250.1, filed on Oct. 13, 2007 and Chinese Patent Application No. 200810090251.8, filed on Mar. 31, 2008, all of which are hereby incorporated by reference in their entireties.

FIELD OF THE INVENTION

The present invention relates to communications, and in particular, to a method, system and apparatus for implementing a Multimedia Ring Back Tone (MRBT) service.

BACKGROUND OF THE INVENTION

The IP Multimedia Subsystem (IMS), defined in Release 5 standards of the 3rd Generation Partnership Project, is a subsystem that supports IP multimedia services. The IMS uses the Session Initiation Protocol (SIP) call control mechanism to create, manage, and terminate various types of multimedia services. The IMS provides a basis for service convergence. Based on IP technologies, the IMS supports voice, data and multimedia services as well as new applications.

The IMS MRBT service is a service which is effective when its subscriber is called. When a call is originated via the IMS domain and the callee is able to answer the call, if the callee is an MRBT service subscriber and has ordered a tone, the ordered tone, such as an audio, video or other multimedia file, will be played to the caller instead of an ordinary ring back tone when the caller waits for the callee to answer the call.

FIG. 1 shows a flowchart of call termination by an IMS MRBT service subscriber.

Step 101: A caller originates an IMS call request.

Step 102: The called Call Session Control Function server (CSCF) receives the IMS call and determines whether the callee has subscribed to the MRBT service according to the service profile of the callee stored in the Home Subscriber Server (HSS) of the callee.

Step 103: If the callee has not subscribed to the MRBT service, the called CSCF sends an IMS call signaling message to the callee.

Step 104: If the callee has subscribed to the MRBT service, the called CSCF sends the call signaling message to the callee tone Application Server (AS).

Step 105: The callee tone AS starts media negotiation between the caller and the called Media Resource Server (MRS) and sends a call signaling message to the callee via the CSCF.

Step 106: The callee tone AS instructs the called MRS to play a tone to the caller when the callee is alerted.

With the above solution, an IMS MRBT can be played to a caller but the played MRBT is ordered by the callee. The solution provides personalized services for the callee. The inventor, however, has not found any ring back tone service ordered by a caller to reflect the personal liking of the caller or any solution that determines whether to play the ring back tone ordered by the caller (referred to as "caller tone") or the ring back tone ordered by the callee (referred to as "callee tone") to the caller when the caller and the caller are both MRBT service subscribers.

SUMMARY OF THE INVENTION

The purpose of the present invention is to provide a solution for determining whether to play a caller tone or a callee tone to a caller according to user settings when both the caller and the callee are MRBT service subscribers. For this purpose, a method for implementing the caller tone service includes:

receiving a call request originated by a calling terminal;

parsing a tone playing policy according to the call request, the tone playing policy specifying whether to play a caller tone or a callee tone;

performing caller tone media negotiation or callee tone media negotiation according to the parsing result; and playing the caller tone or the callee tone to the caller according to the media negotiation result upon reception of an alerting signal from the callee.

A method for implementing the MRBT service includes:

originating, by a calling terminal, a call request and performing caller tone media negotiation or callee tone media negotiation according to a tone playing policy which specifies whether to play a caller tone or a callee tone; and receiving the caller tone or callee tone.

A system for implementing the MRBT service includes:

a calling terminal, adapted to originate a call request;

a tone policy configuring unit, adapted to set a tone playing policy which specifies whether to play a caller tone or a callee tone;

a tone policy parsing unit, adapted to parse the tone playing policy according to the call request; and an MRS, adapted to: perform tone media negotiation according to the parsing result and play a tone to the caller.

A calling terminal includes:

a sending unit, adapted to send a call request;

a tone policy configuring unit, adapted to set a tone playing policy which specifies whether to play a caller tone or a callee tone; and a tone flag adding unit, adapted to add a caller tone flag or a callee tone flag to the call request according to the policy.

Another calling terminal includes:

a sending unit, adapted to send a call request;

a tone policy configuring unit, adapted to set a tone playing policy which specifies whether to play a caller tone or a callee tone; and a tone policy parsing unit, adapted to determine to perform tone media negotiation between the calling terminal and a caller media resource server, or between the calling terminal and a callee media resource server according to the tone playing policy.

A tone AS includes:

a tone policy parsing unit, adapted to parse a tone playing policy and trigger a caller tone or a callee tone according to the policy; and a media negotiating unit, adapted to perform media negotiation between a calling terminal and a media resource server corresponding to the parsing result.

A CSCF includes:

an authenticating unit, adapted to determine whether an end user is an MRBT service subscriber according to a terminal ID carried in a call request and a subscription relation between the terminal ID and the MRBT service stored in an HSS; and a tone policy parsing unit, adapted to: parse a tone playing policy carried in a call request and route a call signaling message of an MRBT service subscriber to a caller tone AS or a callee tone AS according to the policy.

Another tone AS includes:

a tone policy configuring unit, adapted to set a tone playing policy which specifies whether to play a caller tone or a callee tone; and a media negotiating unit, adapted to perform media negotiation between a calling terminal and a calling or called MRS determined by the policy according to a result of parsing the policy.

Another tone AS includes:

a tone policy configuring unit, adapted to set a tone playing policy which specifies whether to play a caller tone or a callee tone;

a tone policy parsing unit, adapted to parse the tone playing policy and trigger a caller tone or callee tone process according to a parsing result; and a media negotiating unit, adapted to perform media negotiation between a calling terminal and a calling or called MRS determined by the policy according to the parsing result.

A method for implementing the tone filtering service includes:

receiving a call request originated by a calling terminal;

determining whether to filter a tone according to the call request; and filtering the tone according to the decision.

Another method for implementing the tone filtering service includes:

originating, by a calling terminal, a call request and receiving an early tone media negotiation request;

determining whether to filter a tone according a stored tone filtering policy; and refusing to perform the tone media negotiation, play the tone, or open a media channel according to the decision.

A server includes:

a receiving unit, adapted to receive a call request originated by a calling terminal;

a determining unit, adapted to determine whether to filter a tone according to the call request; and a filtering unit, adapted to filter the tone according to the decision.

A terminal includes:

a transceiver unit, adapted to: originate a call request and receive an early tone media negotiation request;

a policy unit, adapted to store a tone filtering policy; and a filtering unit, adapted to: determine whether to filter a tone according to the stored tone filtering policy and reject the tone media negotiation, or refuse to play the tone, or refuse to open a media channel, according to the decision.

Another method for implementing the MRBT service includes:

receiving a call request originated by a calling terminal;

sending the call request to a callee and receiving a call response from the callee; and playing a caller tone or a callee tone to the calling terminal according to a tone playing policy and the call response.

Another tone AS includes:

a transceiver unit, adapted to: receive a call request originated by a calling terminal and send the call request to a callee and receive a call response from the callee;

a policy unit, adapted to store a tone playing policy; and a playing unit, adapted to play a caller tone or a callee tone to the calling terminal according to the tone playing policy and the call response.

With the technical solution provided in the embodiments of the present invention, the caller tone service can be implemented in the IMS domain. When both the caller and callee are MRBT service subscribers, the tone AS determines whether to play the caller tone or the callee tone to the caller according to a tone policy.

DETAILED DESCRIPTION OF THE EMBODIMENTS

Figure 1:
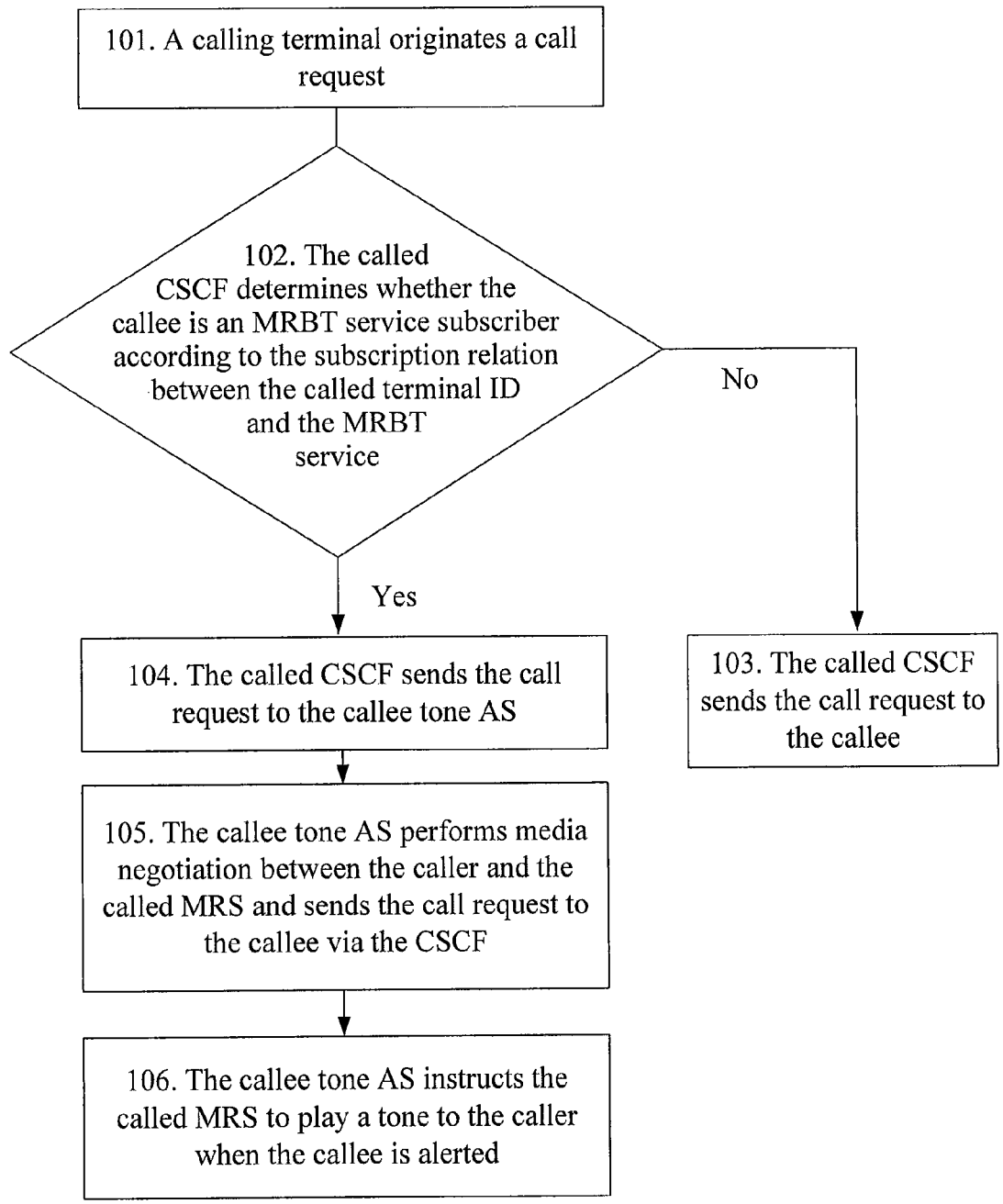
FIG. 1 shows a flowchart of call termination by an MRBT service subscriber in the IMS domain in a prior art.
Figure 2:
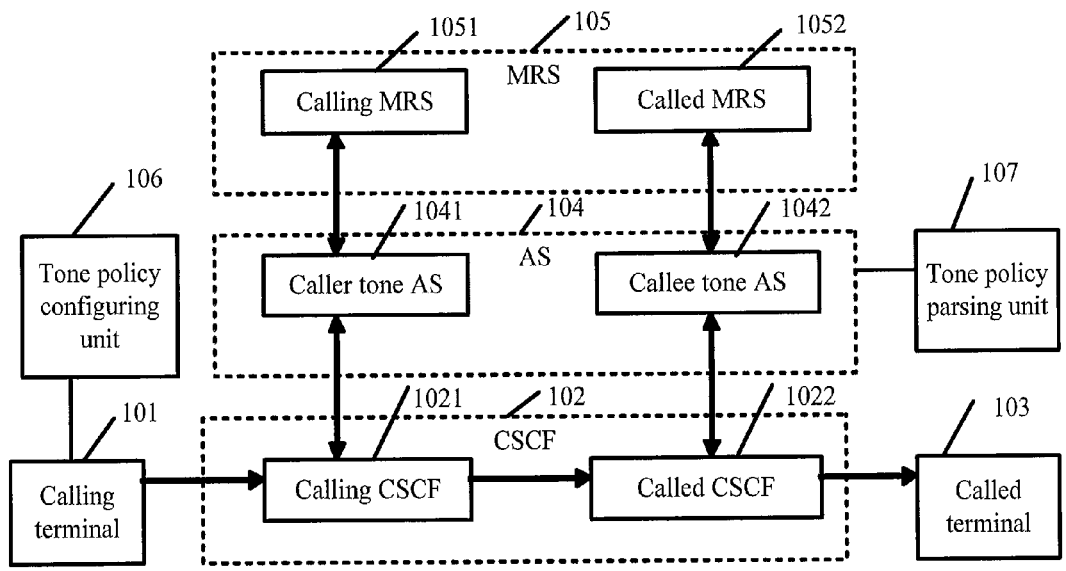
FIG. 2 shows a system for implementing the MRBT service according to embodiment B1 of the present invention.

As shown in FIG. 2, a system for implementing the MRBT service according to embodiment B1 of the present invention includes: a calling terminal 101, a CSCF 102, a tone AS 104, an MRS 105, a called terminal 103, a tone policy configuring unit 106, and a tone policy parsing unit 107. The calling terminal 101 is adapted to originate a call request; the CSCF 102 is adapted to send the call request to the tone AS 104; the tone AS 104 is adapted to perform media negotiation between the caller and the MRS 105; the tone policy configuring unit 106 is adapted to set a tone playing policy which specifies whether to play a caller tone or a caller tone; the tone policy parsing unit 107 is adapted to parse the tone playing policy; the MRS 105 is adapted to negotiate tone media with the caller according to the parsing result and to play a tone to the caller. In FIG. 2, the tone policy configuring unit is placed in the calling terminal 101, and the tone policy parsing unit 107 is placed in the tone AS 104.

More widely, the tone policy configuring unit 106 may be placed in the calling terminal 101, and the tone policy parsing unit 107 may be placed in the tone AS 104 or the CSCF 102, or the calling terminal 101. If the tone AS 104 includes a caller tone AS 1041 and a callee tone 1042, the tone policy parsing unit 107 is placed in both the caller tone AS 1041 and the callee tone 1042. If the CSCF 102 includes a calling CSCF 1021 and a called CSCF 1022, the tone policy parsing unit 107 is placed in both the calling CSCF 1021 and the called CSCF 1022.

Optionally, the tone policy configuring unit 106 may be placed in an entity accessible to the caller tone AS 1041 or the callee tone AS 1042, such as a tone management system and a network address book of a user; the tone policy parsing unit 107 may be placed in the caller tone AS 1042 or the called CSCF 1022 or the caller tone AS 1041.

Figure 3:
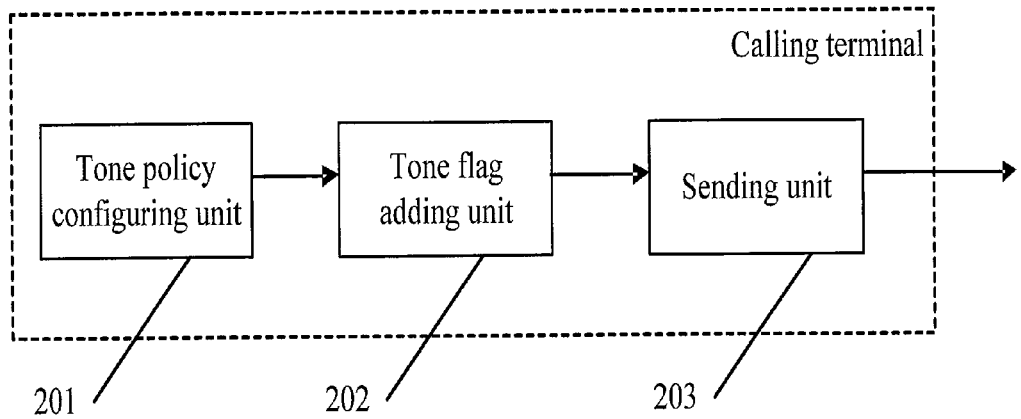
FIG. 3 shows a calling terminal according to embodiment B2 of the present invention.

As shown in FIG. 3, a calling terminal according to embodiment B2 of the present invention includes a tone policy configuring unit 201, a tone flag adding unit 202, and a sending unit 203. The sending unit 203 is adapted to send a call request; the tone policy configuring unit 201 is adapted to set a tone playing policy specifying whether to play a caller tone or a callee tone; and the tone flag adding unit 202 is adapted to add a caller tone flag or a callee tone flag to the call request according to the tone policy.

Figure 4:
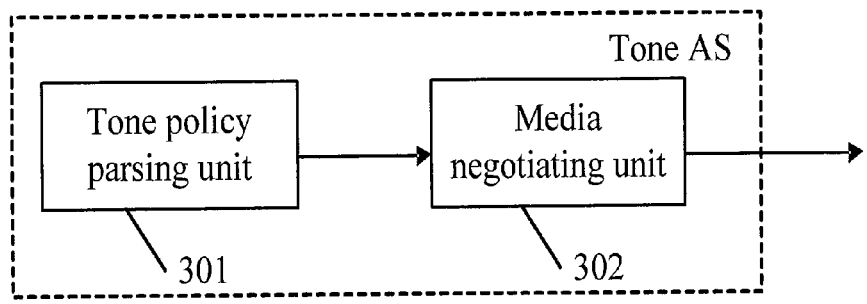
FIG. 4 shows a tone AS according to embodiment B3 of the present invention.

As shown in FIG. 4, a tone AS according to embodiment B3 of the present invention includes a tone policy parsing unit 301 and a media negotiating unit 302. The tone policy parsing unit 301 is adapted to parse the tone playing policy and to trigger the caller tone or the callee tone according to the policy; and the media negotiating unit 302 is adapted to perform media negotiation between the caller and the MRS determined by the policy according to the parsing result.

Figure 5:
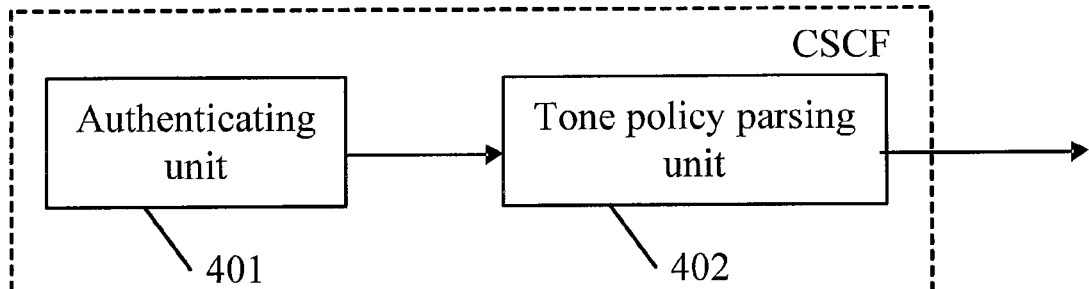
FIG. 5 shows a CSCF according to embodiment B4 of the present invention.

As shown in FIG. 5, a CSCF according to embodiment B4 of the present invention includes an authenticating unit 401 and a tone policy parsing unit 402. The authenticating unit 401 is adapted to determine whether the end user is an MRBT service subscriber according to the terminal ID carried in the call request and subscription relation between the terminal ID and the MRBT service stored in the HSS; and the tone policy parsing unit 402 is adapted to parse the tone playing policy carried in the call request and to route the call signaling message of an MRBT service subscriber to the caller tone AS or the callee tone AS according to the policy.

Figure 6:
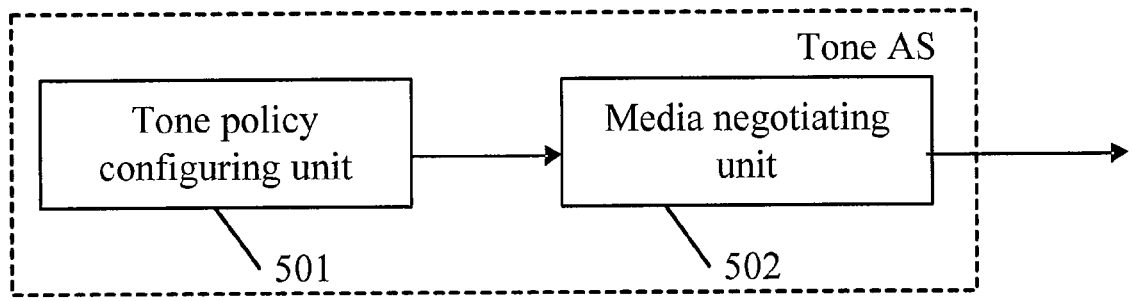
FIG. 6 shows a tone AS according to embodiment B5 of the present invention.

As shown in FIG. 6, a tone AS according to embodiment B5 of the present invention includes a tone policy configuring unit 501 and a media negotiating unit 502. The tone policy configuring unit 501 is adapted to set the tone playing policy specifying whether to play the caller tone or the callee tone; and the media negotiating unit 502 is adapted to perform media negotiation between the caller and the caller or called MRS determined by the policy according to the parsing result.

Figure 7:
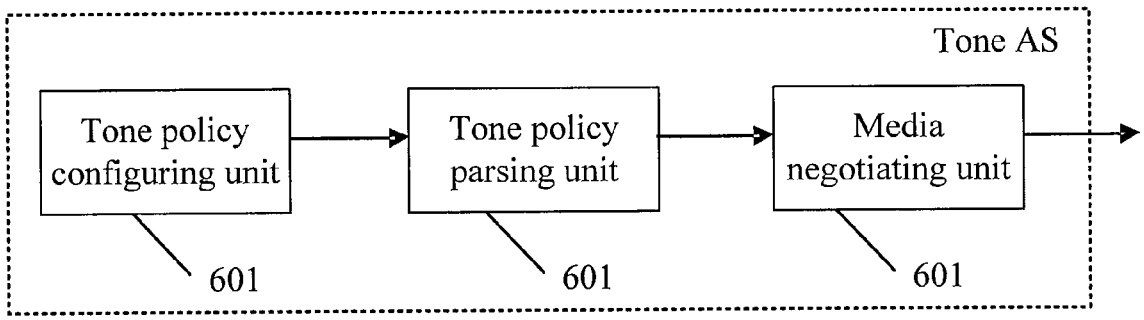
FIG. 7 shows a tone AS according to embodiment B6 of the present invention.

As shown in FIG. 7, a tone AS according to embodiment B6 of the present invention includes a tone policy configuring unit 601, a tone policy parsing unit 602, and a media negotiating unit 603. The tone policy configuring unit 601 is adapted to set the tone playing policy specifying whether to play the caller tone or the callee tone; the tone policy parsing unit 602 is adapted to parse the tone playing policy and to trigger the caller tone or the callee tone according to the policy; and the media negotiating unit 603 is adapted to perform media negotiation between the caller and the caller or called MRS determined by the policy according to the parsing result.

If the tone AS includes a caller tone AS and a callee tone AS, the tone policy configuring unit is placed in the caller tone AS and the tone policy parsing unit 602 is placed in the caller tone AS or the callee tone AS.

Figure 8:
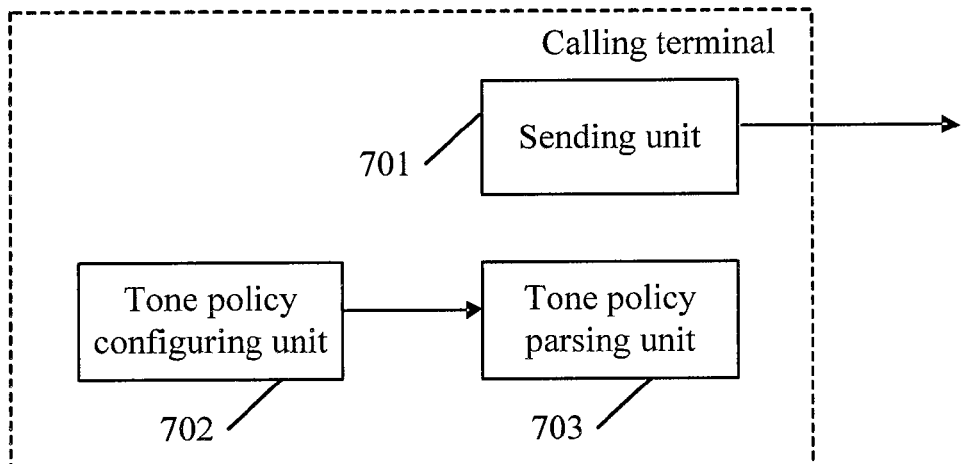
FIG. 8 shows a calling terminal according to embodiment B7 of the present invention.

As shown in FIG. 8, a calling terminal according to embodiment B7 of the present invention includes a sending unit 701, a tone policy configuring unit 702 and a tone policy parsing unit 703. The sending unit 701 is adapted to send a call request; the tone policy configuring unit 702 is adapted to set the tone playing policy specifying whether to play the caller tone or the callee tone; and the tone policy parsing unit 703 is adapted to determine to perform early media negotiation between the caller and the calling MRS or between the caller and the called MRS according to the tone playing policy.

In embodiments B1 to B7, the calling CSCF and the called CSCF may be the same CSCF or different CSCFs; the caller tone AS and the callee tone AS may be the same AS or different ASs; the caller tone management system and callee tone management system may be the same system or different systems. The calling MRS and the called MRS may be the same MRS or different MRSs.

Figure 9:
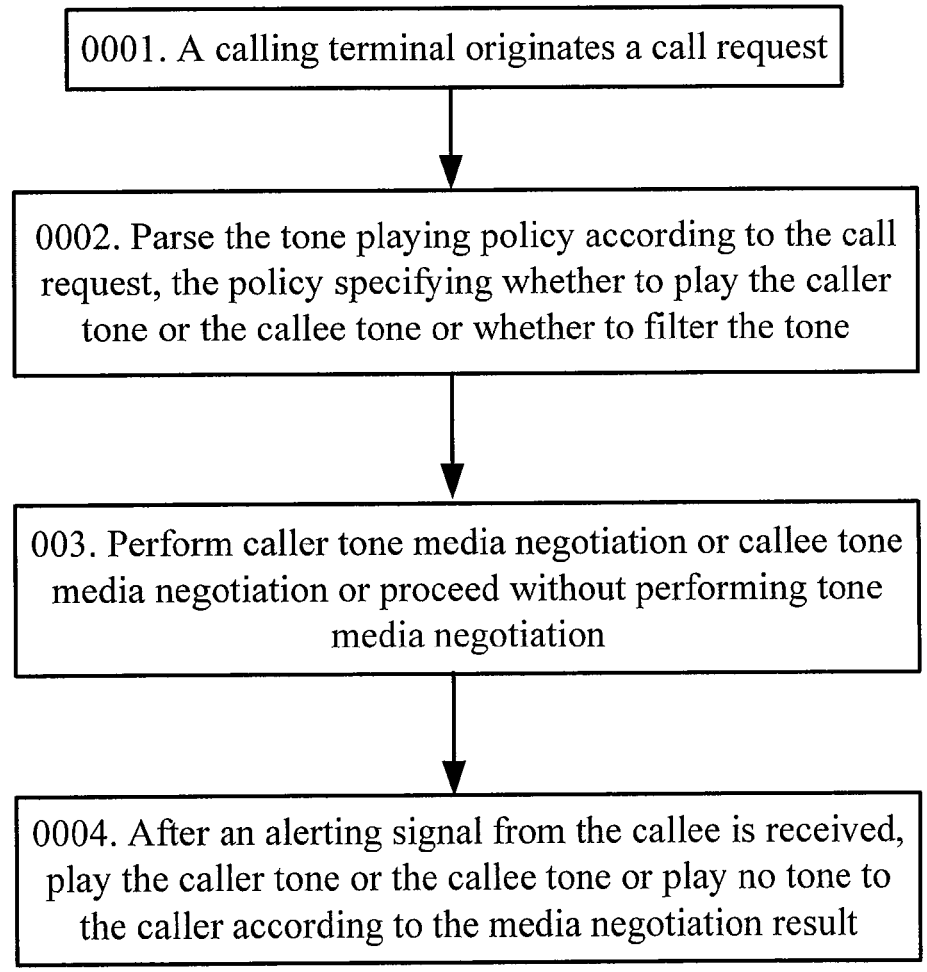
FIG. 9 shows a method for implementing the IMS MRBT service according to embodiment C0 of the present invention.

As shown in FIG. 9, a method for implementing the IMS MRBT service according to embodiment C0 of the present invention includes:

Step 0001: A calling terminal originates a call request.

Step 0002: Parse the tone playing policy according to the call request, where the policy specifies whether to play the caller tone or the callee tone or whether to filter the tone.

Step 0003: Perform caller tone media negotiation or callee tone media negotiation or proceed without performing tone media negotiation.

Step 0004: After an alerting signal from the callee is received, play the caller tone or the callee tone or play no tone to the caller according to the media negotiation result.

Before the above steps, it is necessary to set a tone playing policy, which may be set in the caller tone AS or the calling terminal. Optionally, the tone filtering policy may be set in a tone filtering AS.

Embodiments C1 to C6 provide a method for implementing the MRBT service, where the tone playing policy is set in a caller tone AS.

Embodiments C7 to C11 provide a method for implementing the MRBT service, where the tone playing policy is set in a calling terminal.

When the tone playing policy is set in a caller tone AS, the setting scheme may be customized. The policy may be so set that the caller tone takes precedence over the callee tone under all circumstances; or the policy may be so set that the caller tone is played when a certain condition is met and that the callee tone is played when another condition is met; or the policy may be so set that different caller tones are played according to applicable conditions, for example, different caller tones are played in the event of different callees and different time segments.

The following table describes a policy according to which different tones are played in the event of different callees and the callee tone is played in the case of callees other than B, C, D, E, F, and G.

TABLE 1

User settings in the caller tone AS

| Condition | Tone Flag | Tone Number |
| --- | --- | --- |
| Callee is B, C, or D | caller-tone | Tone No. 1 |
| Callee is E, F or G | | Tone No. 2 |
| Other callees | callee-tone | |

The mapping between tone flags and conditions and the mapping between tone numbers and conditions may be set together in the caller tone AS or an entity accessible to the caller tone AS, such as a caller tone management system. Optionally, they may be set separately. For example, the mapping between tone flags and conditions is set in the caller tone AS and the mapping between tone numbers and conditions is set in the tone management system. The embodiments C1 to C6 adopt the settings in Table 1.

The tone flag may be carried in a new SIP header field or an extended header field, or an extended SDP. Particularly, the flag may be set in a Contact header field; for example, "caller-tone" is added to Schemes of Contact.

In embodiments C1 and C2, a signaling flow and an early media negotiation process are described for exemplary purposes. In the signaling flow, a flag instructing whether to trigger the caller tone or the callee tone is set in the caller tone AS and the flag is parsed by the callee tone AS. In the processes, caller A, callee B and callee H are all MRBT service subscribers.

Figure 10:
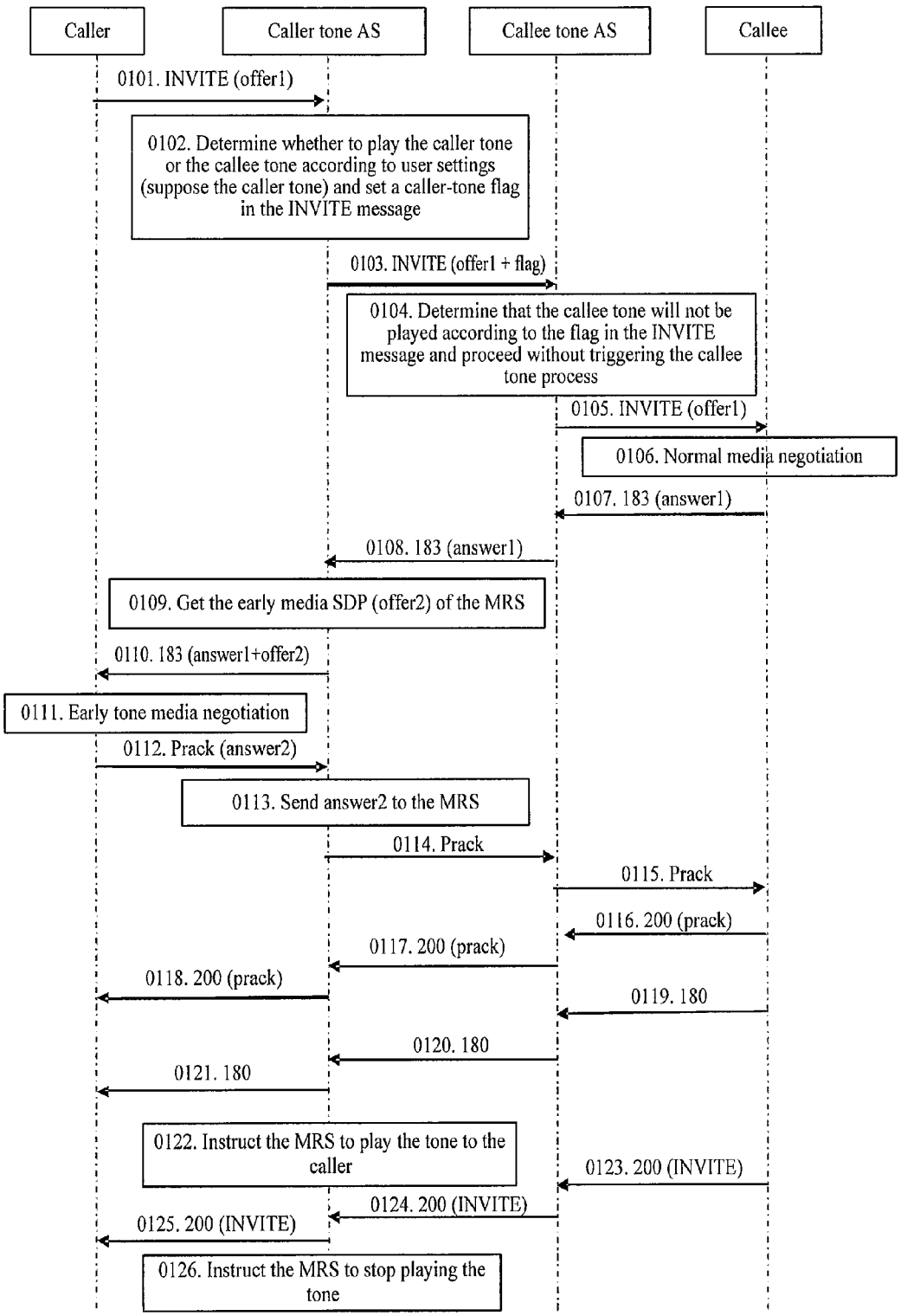
FIG. 10 shows a method for implementing the IMS MRBT service according to embodiment C1 of the present invention.

As shown in FIG. 10, in embodiment C1, a signaling flow where caller A originates an IMS call to callee B and finally the No. 1 caller tone is played includes:

Step 0101: The caller sends an INVITE message which carries the calling terminal ID, called terminal ID and normal media SDP (offer1) of the caller for call setup.

The calling CSCF determines that the caller is an MRBT service subscriber according to the calling terminal ID carried in the INVITE message and the subscription relation between the calling terminal ID and the MRBT service stored in the HSS and routes the call request to the caller tone AS.

Step 0102: The caller tone AS finds that the tone flag corresponding to callee B is "caller-tone" and the corresponding tone number is "Tone No. 1" according to the user settings and terminal ID of callee B and determines to play the No. 1 caller tone when caller A calls callee B. The caller tone AS adds "caller-tone" to the INVITE message and later will trigger step 0109.

Step 0103: The caller tone AS forwards the INVITE message to the called CSCF via the calling CSCF; the called CSCF determines that the callee is an MRBT service subscriber according to the called terminal ID carried in the INVITE message and the subscription relation between the called terminal ID and the MRBT service stored in the HSS and sends the INVITE message carrying the calling terminal ID, called terminal ID, offer1 and caller-tone to the callee tone AS.

Steps 0104 and 0105: The callee tone AS determines that the callee tone will not be played according to the caller-tone flag carried in the INVITE message and sends the INVITE message to the called terminal via the called CSCF.

Steps 0106 and 0107: The called terminal performs normal media negotiation according to its capability and sends a provisional response to the callee tone AS via the called CSCF. The provisional response carries the normal media SDP (answer1) negotiated by the caller and the callee. The response may be a 183 message.

In this embodiment and embodiments C2 to C11 of the present invention, all provisional responses are 183 messages.

Step 0108: The callee tone AS forwards the provisional response to the caller tone AS via the called CSCF and the calling CSCF.

Step 0109: Because it is already determined in step 0102 that the No. 1 caller tone will be played, the caller tone AS gets the early media SDP (offer2) of the calling MRS for early tone media negotiation between the caller and the calling MRS.

Step 0110: The caller tone AS sends the 183 message to the calling terminal via the calling CSCF. The message carries answer1 and offer2.

Steps 0111 and 0112: The calling terminal performs early media negotiation according to its capability and sends a Prack message to the caller tone AS. The message carries the negotiated early tone media SDP (answer2).

Step 0113: The caller tone AS forwards the negotiated early tone media SDP (answer2) to the calling MRS.

Steps 0114 and 0115: The caller tone AS sends the Prack message to the called terminal.

Steps 0116 to 0118: The called terminal sends a response to the calling terminal.

Steps 0119 to 0121: The called terminal is alerted and sends an alerting signal 180 to the calling terminal.

Step 0122: The caller tone AS receives the alerting signal 180 and instructs the calling MRS to play the No. 1 caller tone to the caller.

Steps 0123 to 0125: The callee answers and the called terminal sends an off-hook signal 200 to the calling terminal.

Step 0126: The caller tone AS sends the 200 message and instructs the calling MRS to stop playing the tone.

The above steps are not performed in special order of time; the steps in embodiments C2 to C11 are not performed in special order of time either.

In embodiment C1, the negotiated normal media SDP (offer1) is sent to the caller via a provisional response 183; optionally, it may be sent to the caller in a 200 (INVITE) message in steps 0123 to 0125.

In steps 0101 and 0103 of embodiment C1, the calling CSCF or the called CSCF determines that the caller or the callee is an MRBT service subscriber according to the terminal ID carried in the INVITE message and the subscription relation between the terminal ID and the MRBT service;

optionally, the steps may be performed by the caller tone AS and the callee tone AS. In the following embodiments C2 to C11, authentication related steps may also be performed by the tone AS.

Figure 11:
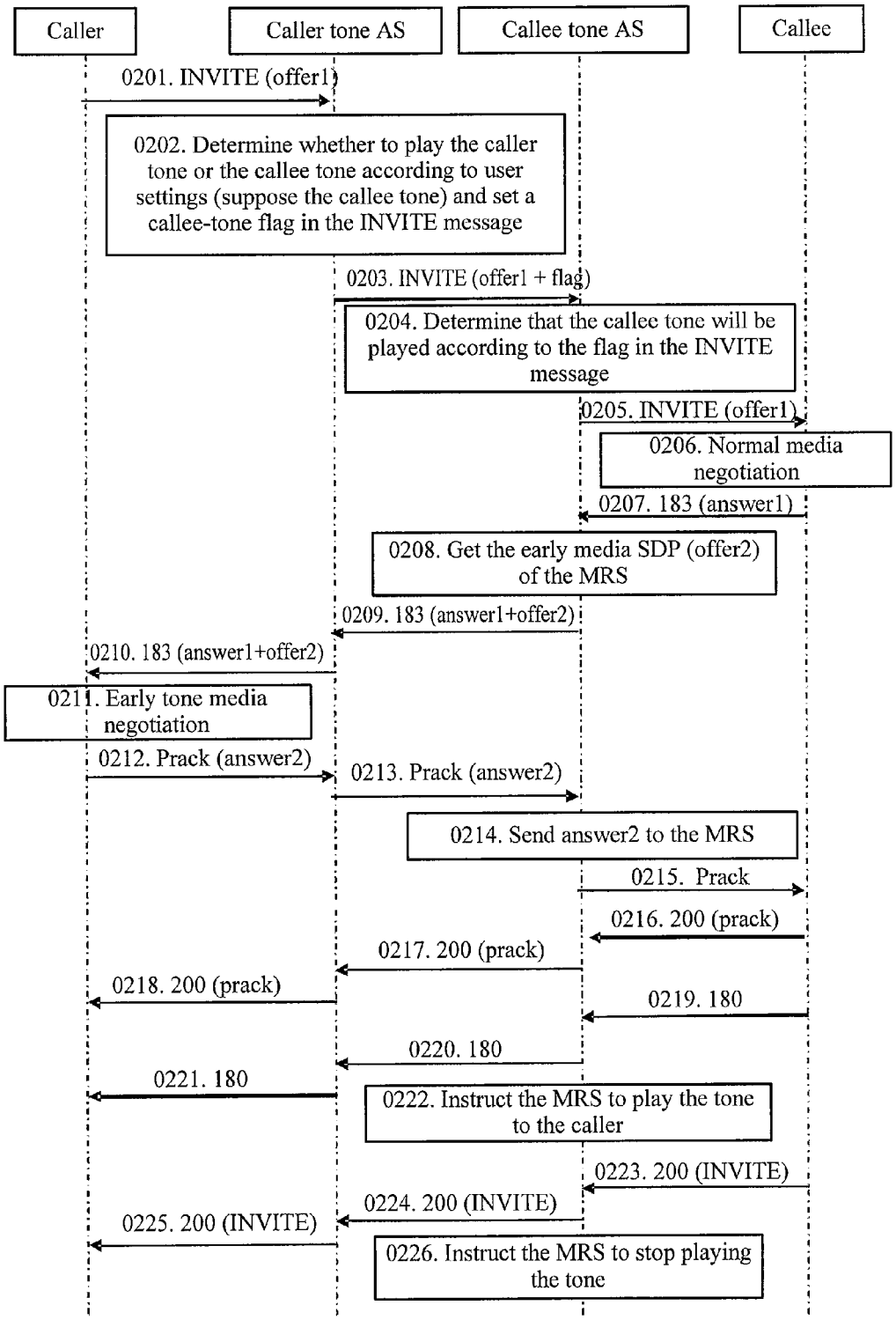
FIG. 11 shows a method for implementing the IMS MRBT service according to embodiment C2 of the present invention.

As shown in FIG. 11, in embodiment C2, a signaling flow where caller A originates an IMS call to callee H and finally the callee tone is played includes:

Step 0201: Similar to step 0101.

Step 0202: The caller tone AS finds that the tone flag corresponding to callee H is "callee-tone" according to the user settings and the terminal ID of callee H and determines that the callee tone will be played when caller A calls callee H. The caller tone AS adds "callee-tone" to the INVITE message.

Step 0203: The caller tone AS forwards the INVITE message to the called CSCF via the calling CSCF; the called CSCF determines that the callee is an MRBT service subscriber according to the called terminal ID carried in the INVITE message and the subscription relation between the called terminal ID and the MRBT service stored in the HSS and sends the INVITE message carrying the calling terminal ID, called terminal ID, the normal media SDP (offer1) of the caller for call setup and callee-tone to the callee tone AS.

Steps 0204 and 0205: The callee tone AS determines that the callee tone will be played according to the callee-tone flag carried in the INVITE message and sends the INVITE message to the called terminal via the called CSCF.

Steps 0206 and 0207: Similar to steps 0106 and 0107.

Step 0208: Because it is already determined in step 0202 that the callee tone will be played, the callee tone AS gets the early media SDP (offer2) of the called MRS.

Steps 0209 and 0210: The callee tone AS sends a 183 message to the caller tone AS via the called CSCF, calling CSCF and the caller tone AS; the 183 message carries the negotiated normal media SDP (answer1) and offer2.

Step 0211: The calling terminal performs early tone media negotiation according to its capability.

Steps 0212 and 0213: The calling terminal sends a Prack message to the callee tone AS via the calling CSCF and the called CSCF. The message carries the negotiated early tone media SDP (answer2).

Step 0214: The callee tone AS forwards the negotiated early tone media SDP (answer2) to the called MRS.

Step 0215: The callee tone AS forwards the Prack message to the called terminal.

Steps 0216 to 0221: Similar to steps 0116 to 0121.

Step 0222: The callee tone AS receives the 180 message and instructs the called MRS to play the tone to the caller.

Steps 0223 and 0225: Similar to steps 0123 and 0125.

Step 0226: The callee tone AS receives the 200 message and instructs the called MRS to stop playing the tone.

In embodiment C2, callee H is an MRBT service subscriber; if callee H has not ordered an MRBT, two processing solutions are available.

Solution 1: Play a traditional ring back tone to the caller.

Solution 2: Play a caller tone, similar to the embodiments shown in FIGS. 26, 27 and 28.

In embodiments C3 and C4, a signaling flow and an early media negotiation process are described for exemplary purposes. In the signaling flow, a flag instructing whether to trigger the caller tone or the callee tone is set in the caller tone AS and the flag is parsed by the callee tone AS. In the processes, caller A, callee C and callee J are all MRBT service subscribers.

Figure 12:
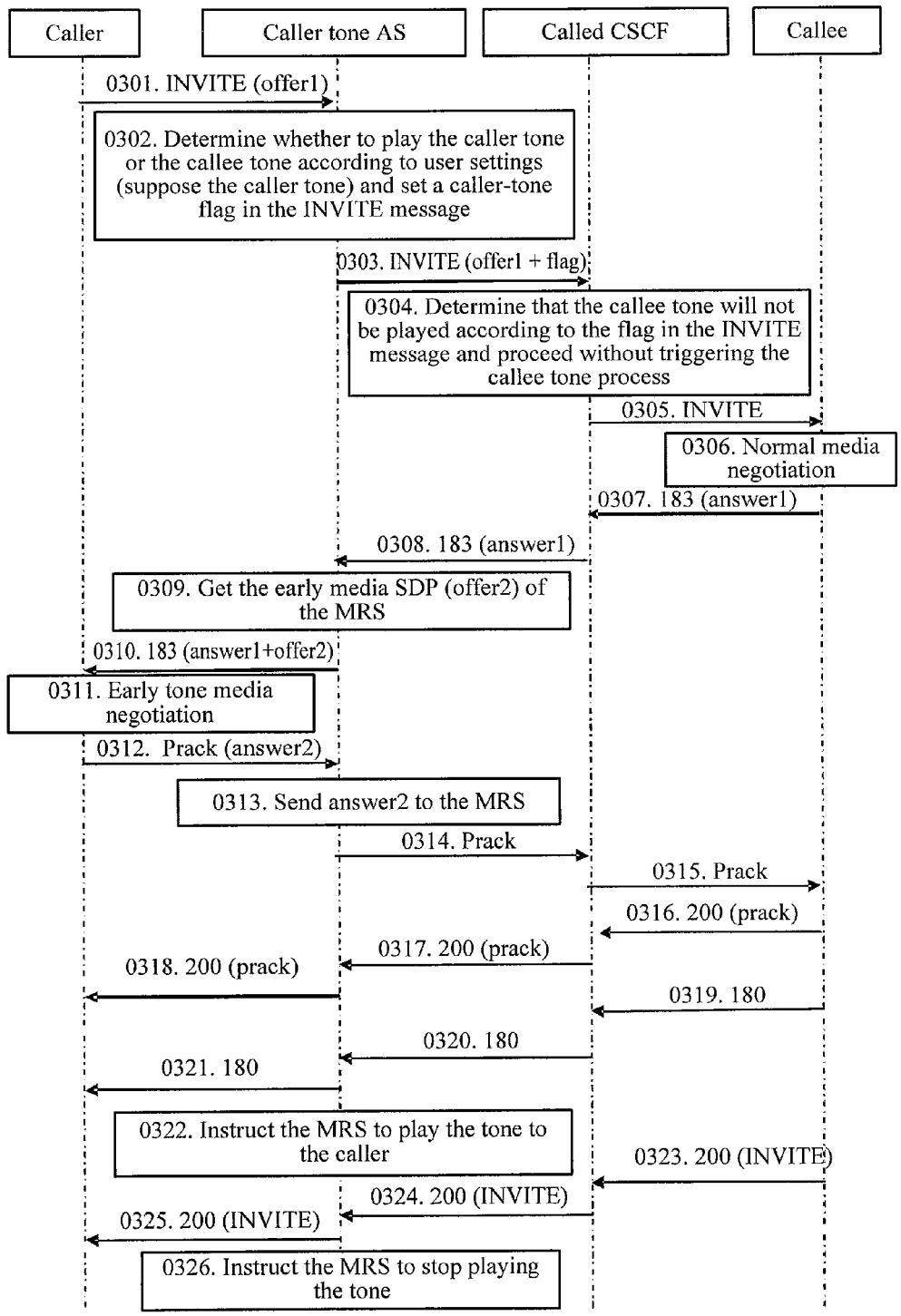
FIG. 12 shows a method for implementing the IMS MRBT service according to embodiment C3 of the present invention.

As shown in FIG. 12, in embodiment C3, a signaling flow where caller A originates an IMS call to callee D and finally the caller tone is played includes:

Steps 0301 and 0302: Similar to steps 0101 and 0102. In step 0302, the caller tone AS has triggered step 0309 according to the caller-tone flag carried in the INVITE message to get the early media SDP (offer2) of the calling MRS.

Steps 0303 and 0304: The caller tone AS routes the INVITE message to the called CSCF via the calling CSCF; the called CSCF determines that the callee is an MRBT service subscriber according to the called terminal ID carried in the INVITE message and the subscription relation between the called terminal ID and the MRBT service stored in the HSS; and the called CSCF determines that the callee tone will not be played according to the caller-tone flag carried in the INVITE message.

Step 0305: The called CSCF forwards the INVITE message directly to the called terminal. The INVITE message carries the calling terminal ID, called terminal ID, offer1 and caller-tone.

Steps 0306 and 0326: Similar to steps 0106 and 0126.

Figure 13:
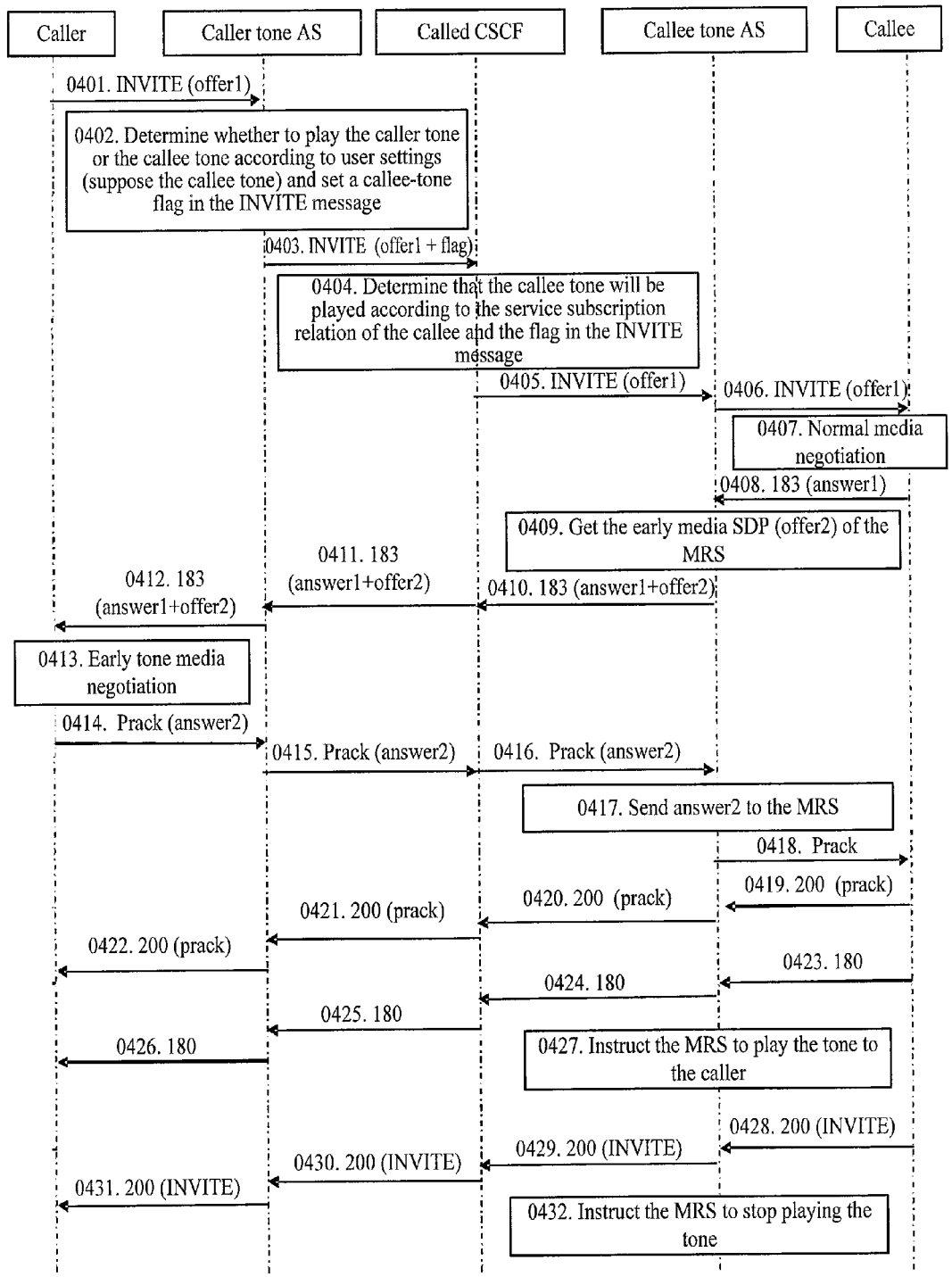
FIG. 13 shows a method for implementing the IMS MRBT service according to embodiment C4 of the present invention.

As shown in FIG. 13, in embodiment C4, a signaling flow where caller A originates an IMS call to callee I and finally the callee tone is played includes:

Steps 0401 and 0403: Similar to steps 0201 and 0203.

Step 0404: The called CSCF determines that the callee tone will be played according to the callee-tone flag carried in the INVITE message.

Step 0405: The called CSCF forwards the INVITE message to the callee tone AS, where the INVITE message carries the calling terminal ID, called terminal ID, offer1 and callee-tone; the callee tone AS triggers step 0409 according to the callee-tone flag to get the early media SDP (offer2) of the called MRS.

Steps 0406 and 0432: Similar to steps 0205 and 0226.

In embodiments C5 and C6, a signaling flow and an early media negotiation process are described for exemplary purposes. In the signaling flow, a flag instructing whether to trigger the caller tone or the callee tone is set in the caller tone AS and the flag is parsed by the caller tone AS. In the processes, caller A, callee D and callee K are all MRBT service subscribers.

Figure 14:
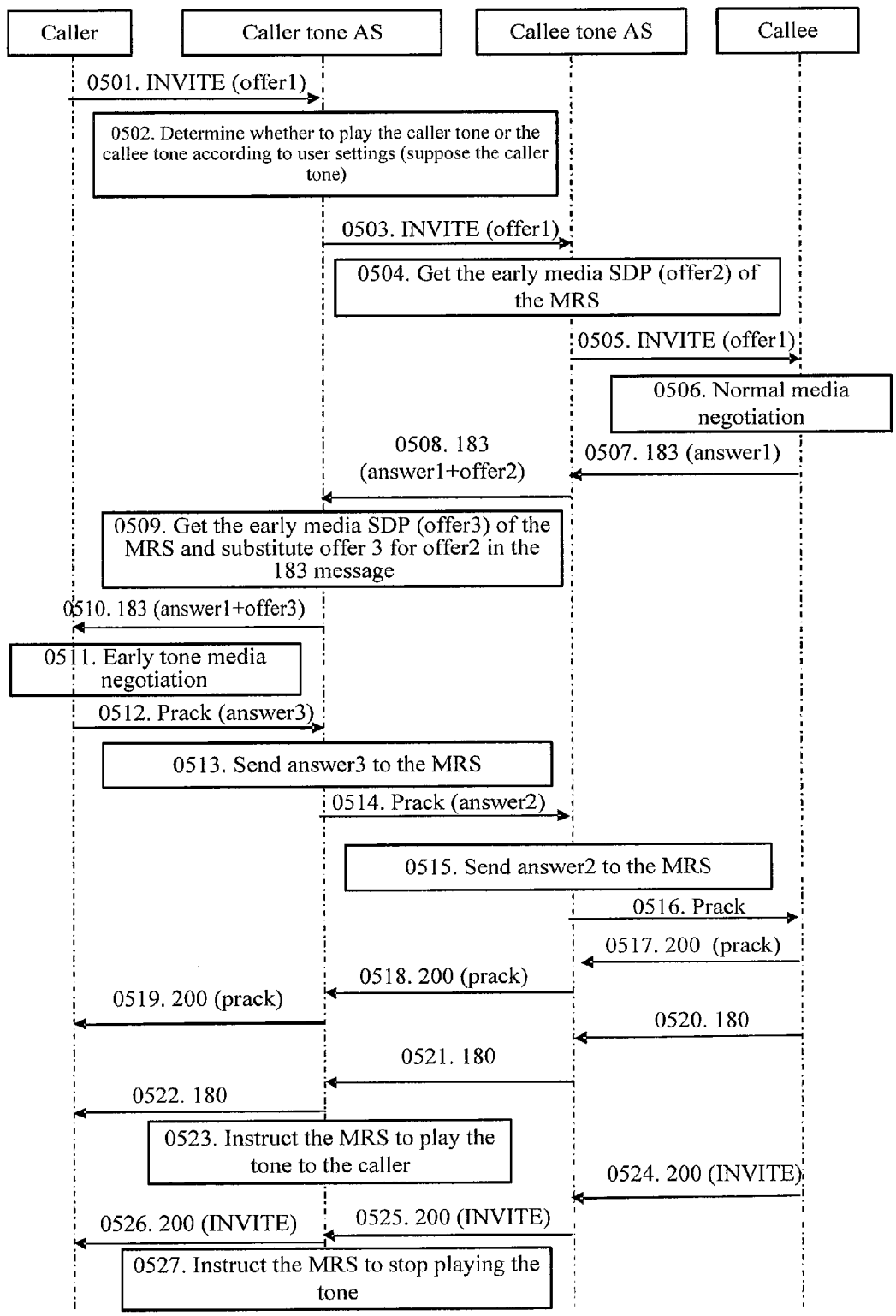
FIG. 14 shows a method for implementing the IMS MRBT service according to embodiment C5 of the present invention.

As shown in FIG. 14, in embodiment C5, a signaling flow where caller A originates an IMS call to callee D and finally the caller tone is played includes:

Step 0501: Similar to step 0101.

Step 0502: The caller tone AS finds that the corresponding tone flag is "caller-tone" and that the tone number is "tone No. 1" according to user settings and the terminal ID of callee D and determines that the No. 1 caller tone will be played when caller A calls callee D.

Step 0503: The caller tone AS routes the INVITE message to the called CSCF via the calling CSCF; the called CSCF determines that callee D is an MRBT service subscriber according to the called terminal ID carried in the INVITE message and the subscription relation between the called terminal ID and the MRBT service stored in the HSS; and the called CSCF forwards the INVITE message to the callee tone AS.

Step 0504: The callee tone AS gets the early media SDP (offer2) of the called MRS.

Step 0505: The callee tone AS sends the INVITE message to the called terminal via the called CSCF. The INVITE message carries the calling terminal ID, called terminal ID, and the normal media SDP (offer1) of the caller for call setup.

Steps 0506 and 0507: The called terminal performs normal media negotiation according to its capability and sends a 183 message to the callee tone AS via the called CSCF. The 183 message carries the normal media SDP (answer1) negotiated by the caller and the callee.

Step 0508: The callee tone AS sends the 183 message to the caller tone AS via the called CSCF and the calling CSCF. The 183 message carries the normal media SDP (answer1) negotiated by the caller and the callee and the early media SDP (offer2) of the called MRS.

A service ID or an appropriate media attribute mark may be set in offer2, indicating that offer2 is the SDP for the callee tone service. Line m may be extended to describe the media type "callee tone", for example:

m=application 2456 TCP callee-tone

Step 0509: The caller tone AS gets the early media SDP (offer3) of the calling MRS for early tone media negotiation between the caller and the calling MRS.

Step 0510: The caller tone AS substitutes the early media SDP of the calling MRS (offer3) for the early media SDP of the called MRS (offer2) in the 183 message and sends the 183 message to the calling terminal via the calling CSCF. The 183 message carries the negotiated normal media SDP (answer1) and the early media SDP of the calling MRS (offer3).

Steps 0511 and 0512: The calling terminal performs early media negotiation according to its capability and sends a Prack message to the caller tone AS. The message carries the negotiated early tone media SDP (answer3).

Step 0513: The caller tone AS forwards the negotiated early tone media SDP (answer3) to the calling MRS.

Steps 0514 and 0515: The caller tone AS performs media negotiation with the called MRS on behalf of the caller. In answer2, the calling terminal port number may be set to 0 or the media direction attribute may be modified to "sendonly".

Steps 0516 and 0527: Similar to steps 0115 to 0126.

Figure 15:
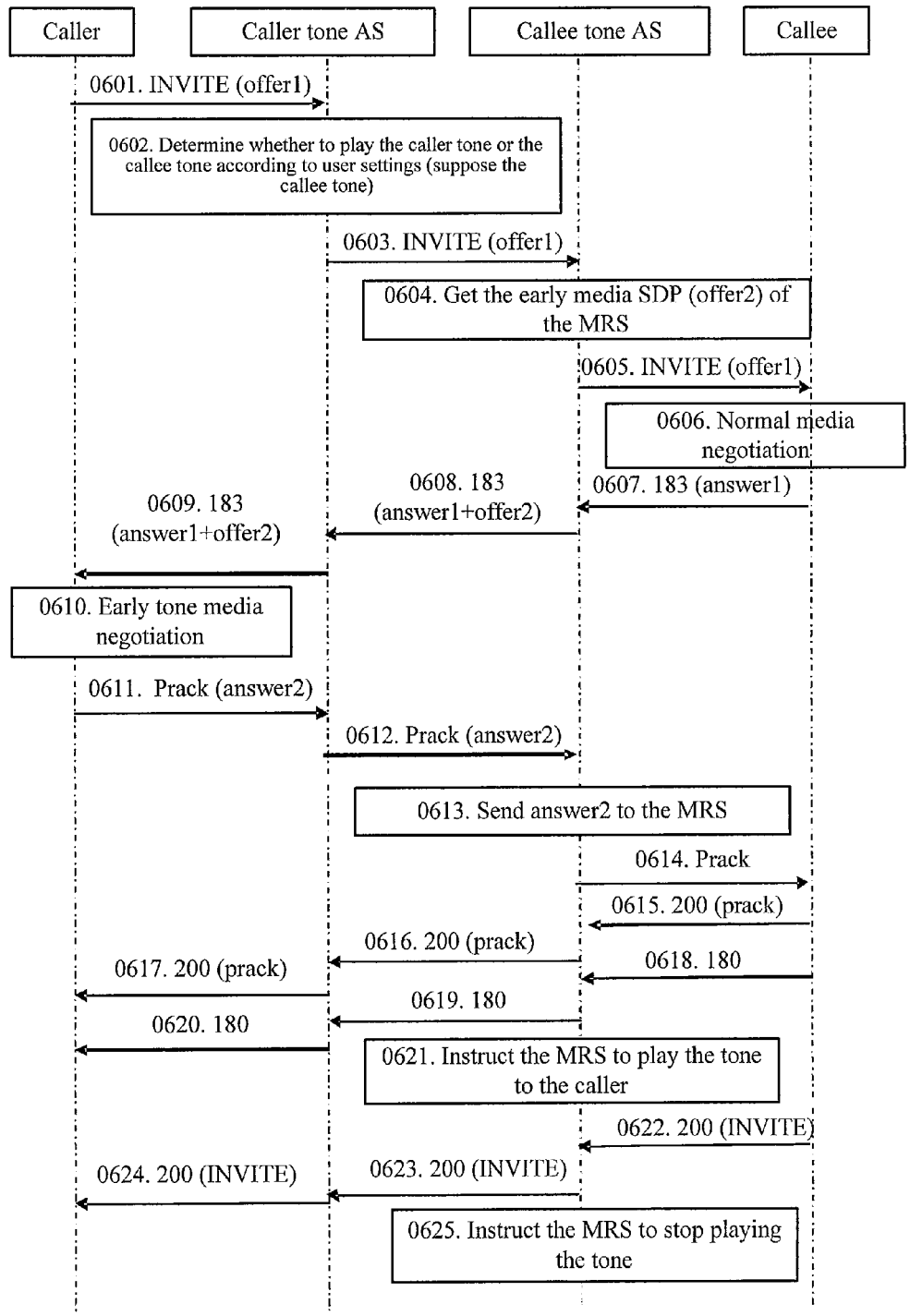
FIG. 15 shows a method for implementing the IMS MRBT service according to embodiment C6 of the present invention.

As shown in FIG. 15, in embodiment C6, a signaling flow where caller A originates an IMS call to callee K and finally the callee tone is played includes:

Step 0601: Similar to step 0101.

Step 0602: The caller tone AS finds that the corresponding tone flag is "callee-tone" according to user settings and the terminal ID of callee K and determines that the callee tone will be played when caller A calls callee K.

Steps 0603 and 0608: Similar to steps 0503 and 0508.

Step 0608: The caller tone AS sends the 183 message to the calling terminal via the calling CSCF. The 183 message carries the negotiated normal media SDP (answer1) and the early media SDP of the called MRS (offer2).

Step 0610: The calling terminal performs early tone media negotiation according to its capability.

Steps 0611 and 0625: Similar to steps 0212 and 0225.

In embodiments C7 to C11 of the present invention, the calling terminal A may be so set that the tone meeting a preset condition is played. The setting scheme may be customized. Particularly, the setting may be that the caller tone is played under all circumstances, which means the caller tone takes precedence over the callee tone; optionally, the setting may be that the caller tone is player when a certain condition is met and that the callee tone is player when another condition is met.

The following table describes a setting scheme where different tones are played in the event of different callees:

TABLE 2

| User settings in the calling terminal | |
|---|---|
| Condition | Tone Flag |
| Callee is b, c, or d | caller tone |
| Other callees | callee tone |

The tone ID may be carried in a new SIP header field or an extended header field, or an extended SDP. Particularly, the flag may be set in a Contact header field; for example, "caller-tone" is added to Schemes of Contact.

In embodiments C7 and C8, caller A, callee b and callee e are all MRBT service subscribers; the calling terminal sets a flag instructing to play the caller tone or the callee tone in the call request and the caller tone AS and the callee tone AS parse the flag in the call request.

Figure 16:
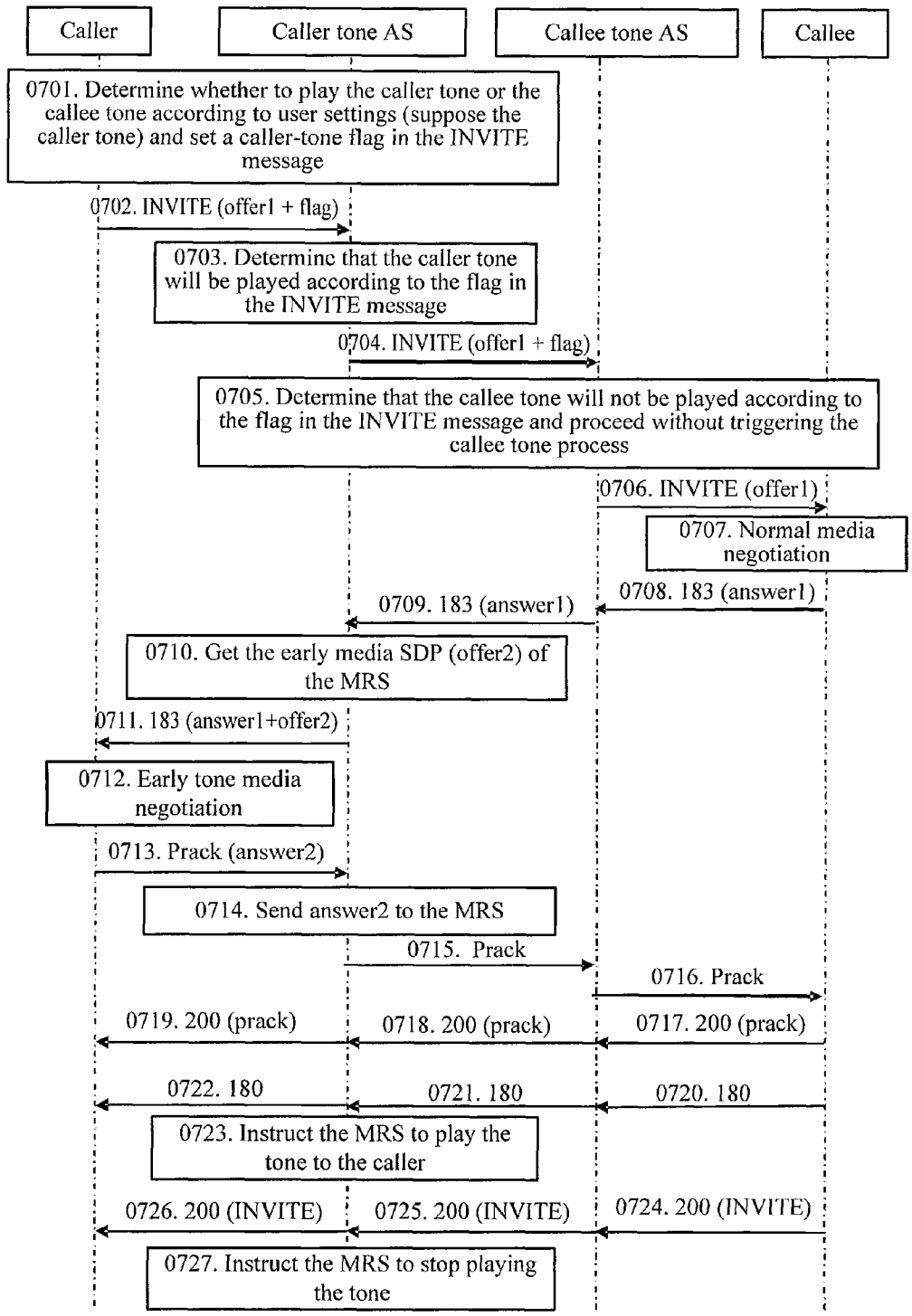
FIG. 16 shows a method for implementing the IMS MRBT service according to embodiment C7 of the present invention.

As shown in FIG. 16, in embodiment C7, a signaling flow where caller A originates an IMS call to callee b and finally the caller tone is played includes:

Step 0701: The calling terminal finds that the tone flag corresponding to callee b is "caller-tone" according to the user settings and the terminal ID of callee b and determines that the caller tone will be played when caller A calls callee b. The calling terminal adds "caller-tone" to an INVITE message.

Step 0702: The calling terminal sends the INVITE message to the calling CSCF; the calling CSCF determines that caller A is an MRBT service subscriber according to the calling terminal ID carried in the INVITE message and the subscription relation between the calling terminal ID and the MRBT service stored in the HSS and forwards the INVITE message to the caller tone AS, where the forwarded INVITE message carries the calling terminal ID, called terminal ID, the normal media SDP (offer1) of the caller for call setup and caller-tone.

Step 0703: The caller tone AS determines that the caller tone will be played according to the caller-tone flag carried in the INVITE message and triggers a caller tone process, namely, step 0710, where the caller tone AS gets the early media SDP (offer2) of the MRS.

Step 0704: The caller tone AS routes the INVITE message to the calling CSCF and the called CSCF; the called CSCF determines that the callee is an MRBT service subscriber according to the called terminal ID carried in the INVITE message and the subscription relation between the called terminal ID and the MRBT service stored in the HSS; and the called CSCF forwards the INVITE message to the callee tone AS.

Step 0705: The callee tone AS determines that the caller tone will be played according to the caller-tone flag carried in the INVITE message and proceeds without triggering a callee tone process.

Steps 0706 and 0727: Similar to steps 0105 and 0126.

If the callee in the preceding embodiment is b' who is not an MRBT service subscriber, the signaling flow is like the above and the differences are as follows: In step 0704, the called CSCF determines that callee b is not an MRBT service subscriber according to the called terminal ID carried in the INVITE message and the subscription relation between the called terminal ID and the MRBT service stored in the HSS, and sends the INVITE message directly to the callee; and there is no step 0705. The other steps are all like those in embodiment C7 of the present invention. This means, if the callee is not an MRBT service subscriber, the setting is as follows: The calling terminal sets a flag instructing whether to trigger the caller tone or the callee tone in the call request and the caller tone AS parses the flag in the call request.

Figure 17:
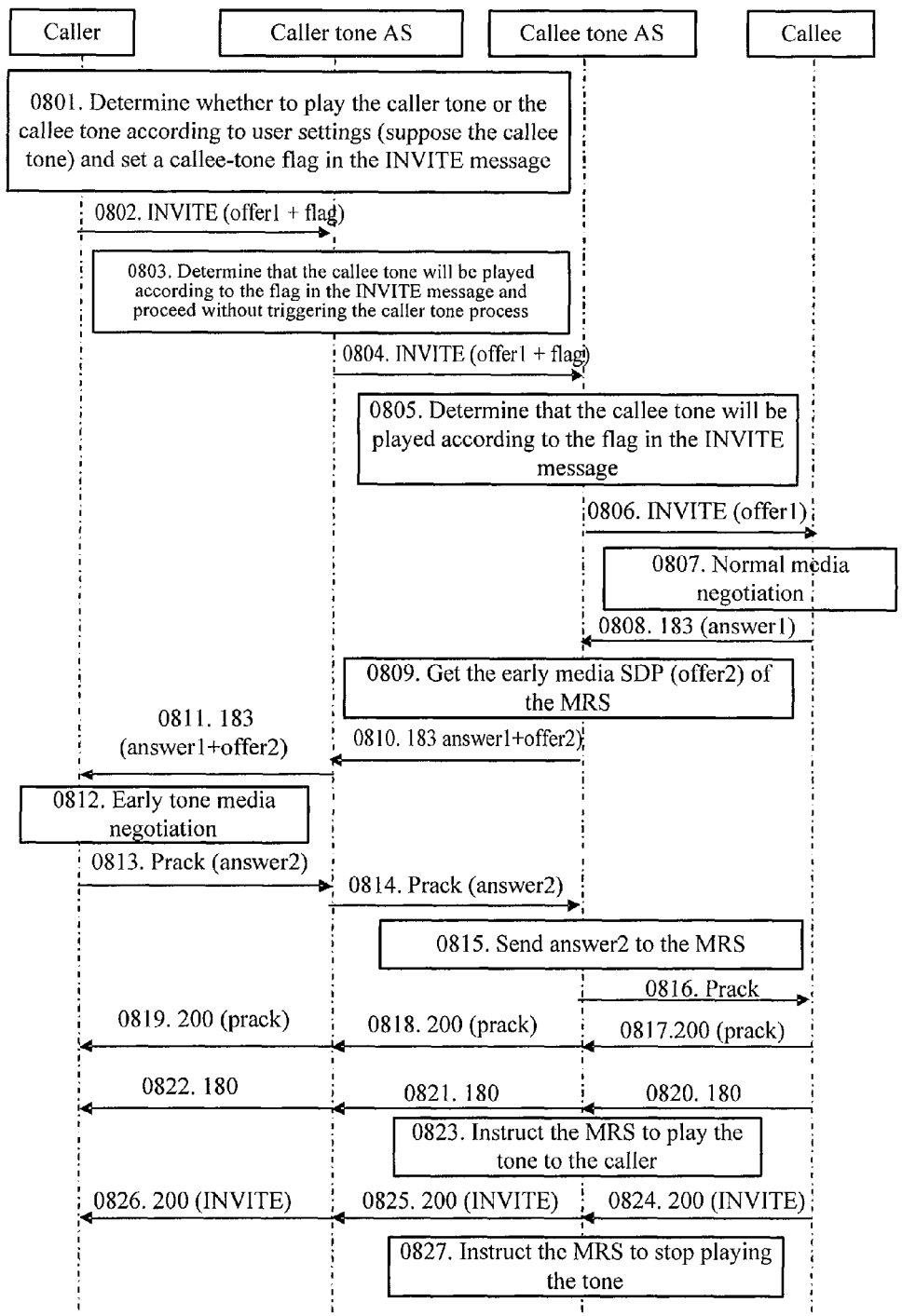
FIG. 17 shows a method for implementing the IMS MRBT service according to embodiment C8 of the present invention.

As shown in FIG. 17, in embodiment C8, a signaling flow where caller A originates an IMS call to callee e and finally the callee tone is played includes:

Step 0801: The calling terminal finds that the tone flag corresponding to callee b is "callee-tone" according to the user settings and the terminal ID of callee b and determines that the callee tone will be played when caller A calls callee b. The calling terminal adds "callee-tone" to the INVITE message.

Step 0802: The calling terminal sends the INVITE message to the calling CSCF; the calling CSCF determines that caller A is an MRBT service subscriber according to the calling terminal ID carried in the INVITE message and the subscription relation between the calling terminal ID and the MRBT service stored in the HSS and forwards the INVITE message to the caller tone AS, where the forwarded INVITE message carries the calling terminal ID, called terminal ID, the normal media SDP (offer1) of the caller for call setup and callee-tone.

Step 0803: The caller tone AS determines that the callee tone will be played according to the callee-tone flag carried in the INVITE message and proceeds without triggering the caller tone process.

Step 0804: Similar to step 0704.

Step 0805: The callee tone AS determines that the callee tone will be played according to the callee-tone flag carried in the INVITE message and triggers the callee tone process, namely, step 0809, where the callee tone AS gets the early media SDP (offer2) of the called MRS.

Steps 0806 and 0827: Similar to steps 0706 and 0727.

In embodiments C9 and C10, caller A, callee c and callee f are all MRBT service subscribers; the calling terminal sets a flag instructing whether to play the caller tone or the callee tone in the call request and the caller tone AS and the callee tone AS parse the flag in the call request.

Figure 18:
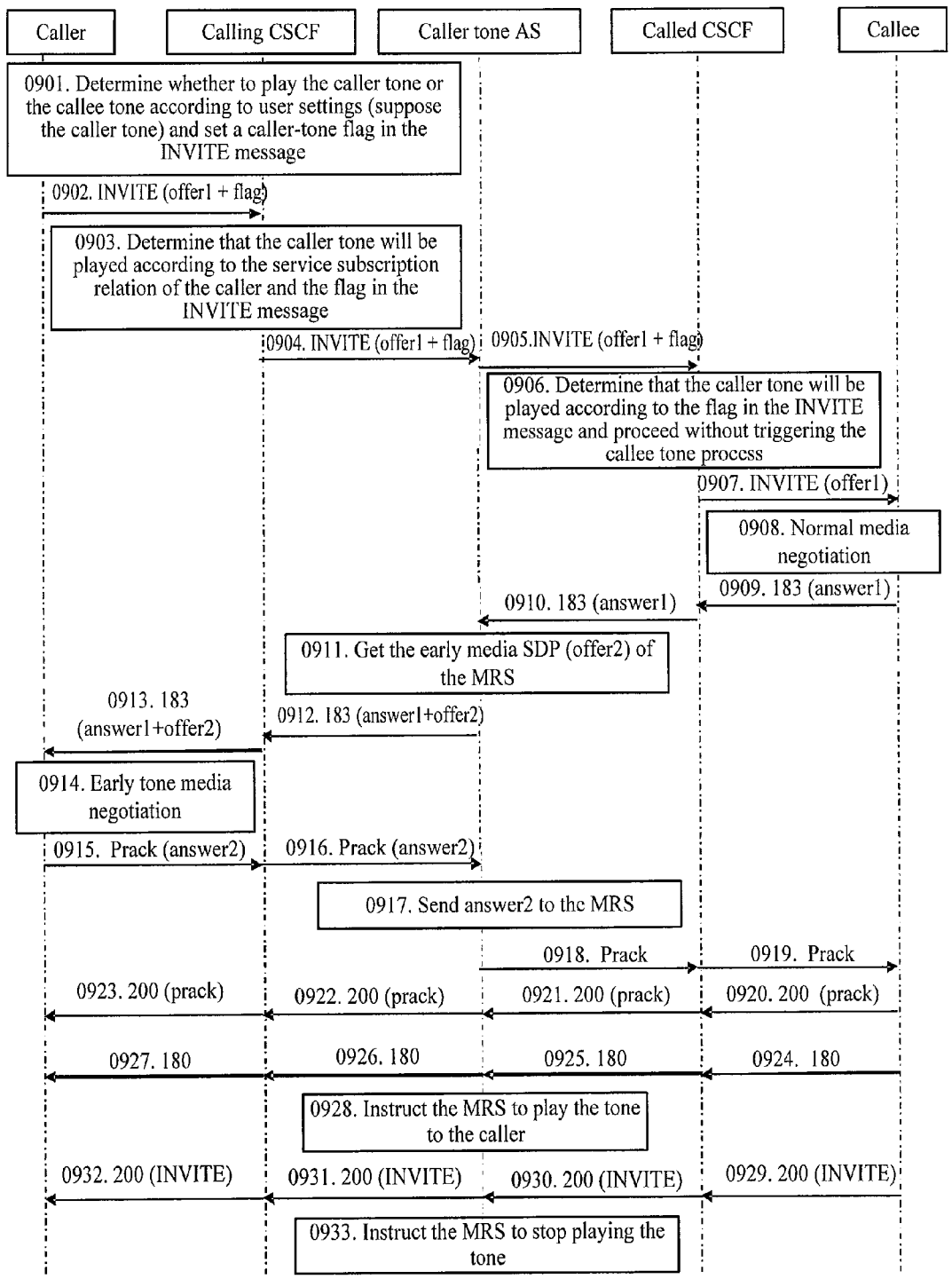
FIG. 18 shows a method for implementing the IMS MRBT service according to embodiment C9 of the present invention.

As shown in FIG. 18, in embodiment C9, a signaling flow where caller A originates an IMS call to callee c and finally the caller tone is played includes:

Step 0901: Similar to step 0701.

Step 0902: The caller sends to the calling CSCF an INVITE message which carries the calling terminal ID, called terminal ID, and normal SDP (offer1) of the caller for call setup, and caller-tone.

Steps 0903 and 0904: The calling CSCF determines that the caller is an MRBT service subscriber according to the calling terminal ID carried in the INVITE message and the subscription relation between the calling terminal ID and the MRBT service stored in the HSS and determines that the caller tone will be played according to the caller-tone flag carried in the INVITE message; therefore, the calling CSCF routes the INVITE message to the caller tone AS and later step 0911 will be performed where the caller tone AS gets the early media SDP of the MRS (offer2).

Step 0905: The caller tone AS sends the INVITE message to the called CSCF via the calling CSCF.

Steps 0906 and 0907: The called CSCF determines that the caller tone will be played according to the caller-tone flag carried in the INVITE message and forwards the INVITE message directly to the callee.

Steps 0908 and 0933: Similar to steps 0106 and 0126.

Figure 19:
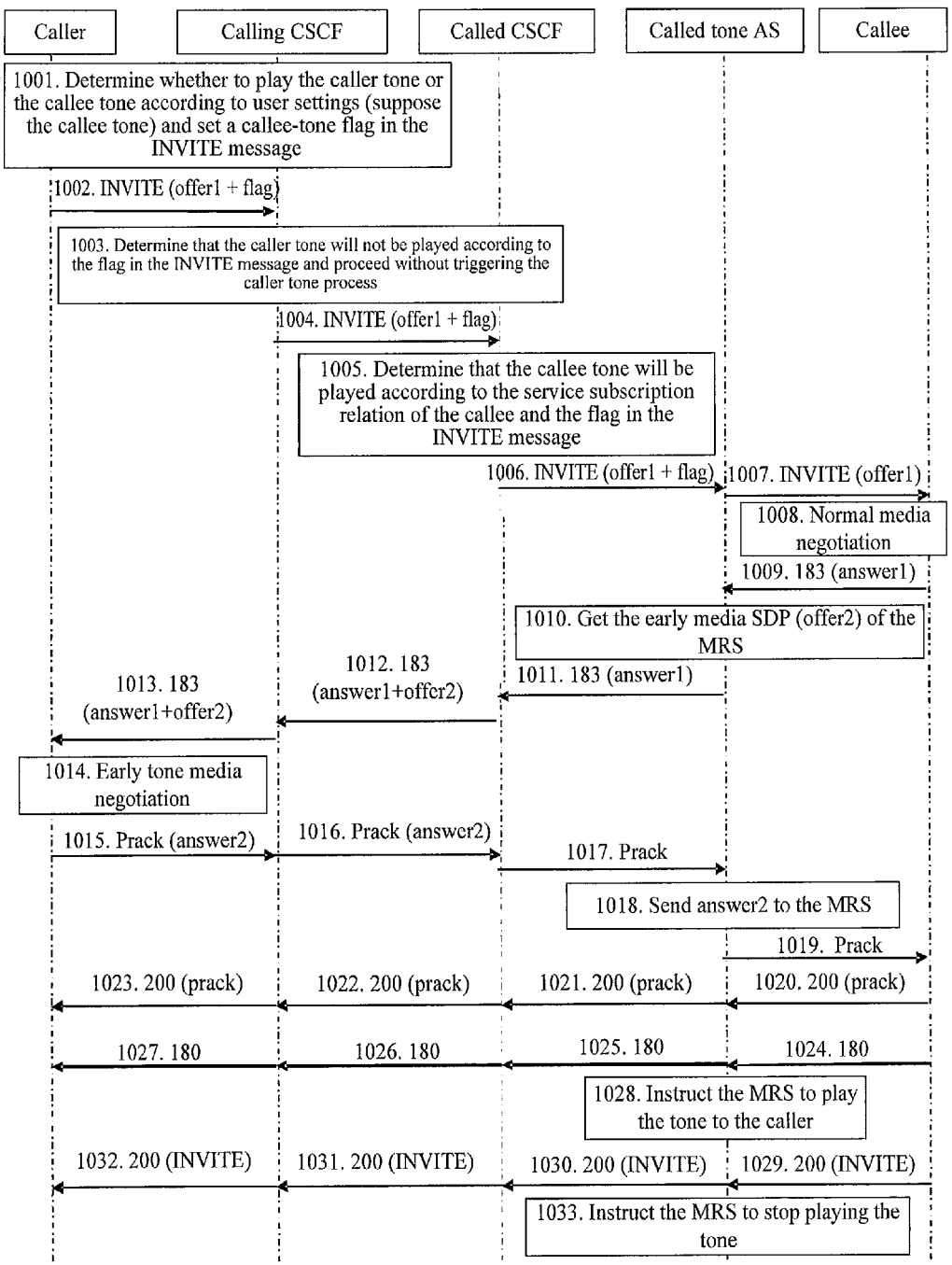
FIG. 19 shows a method for implementing the IMS MRBT service according to embodiment C10 of the present invention.

As shown in FIG. 19, in embodiment C10, a signaling flow where caller A originates an IMS call to callee f and finally the callee tone is played includes:

Step 1001: Similar to step 0801.

Steps 1002 to 1004: The calling terminal sends the INVITE message to the calling CSCF; the INVITE message carries the calling terminal ID, called terminal ID, normal media SDP (offer1) of the caller for call setup and callee-tone; the calling CSCF determines that the callee tone will be played according to the callee-tone flag carried in the INVITE message and therefore forwards the INVITE message directly to the called CSCF.

Step 1005: The called CSCF determines that the callee is an MRBT service subscriber according to the called terminal ID carried in the INVITE message and the subscription relation between the called terminal ID and the MRBT service stored in the HSS and determines that the callee tone will be played according to the callee-tone flag carried in the INVITE message; therefore, the called CSCF routes the INVITE message to the callee tone AS and later the callee tone AS will get the early media SDP of the called MRS (offer2).

Steps 1006 and 1033: Similar to steps 0205 and 0226.

In embodiment C11 of the present invention, caller A and callee d are both MRBT service subscribers; the policy specifying whether to play the caller tone or the callee tone is set in the calling terminal and the calling terminal parses the policy and determines whether to perform early caller media negotiation or early callee media negotiation.

Figure 20:
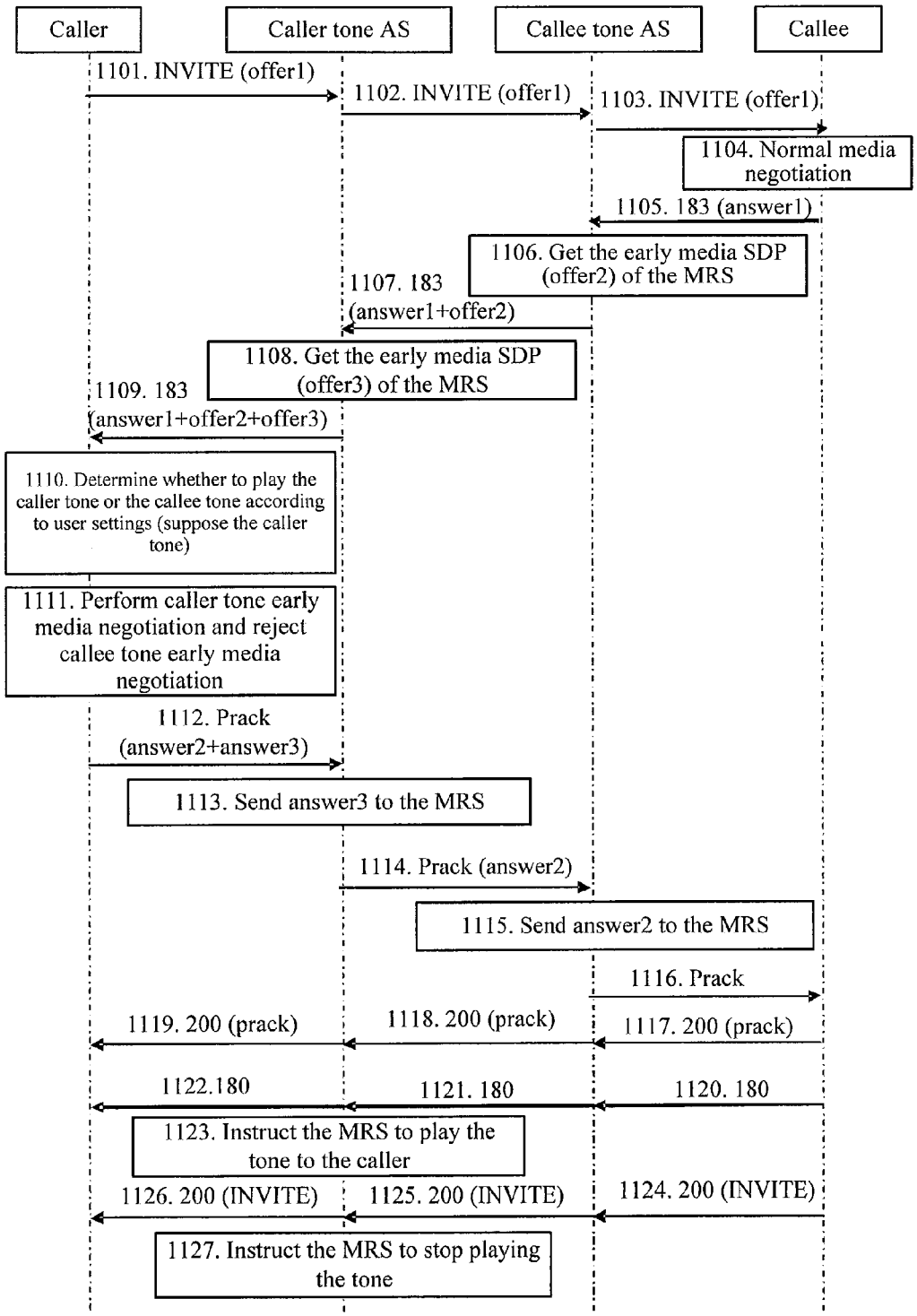
FIG. 20 shows a method for implementing the IMS MRBT service according to embodiment C11 of the present invention.

As shown in FIG. 20, in embodiment C11, a signaling flow where caller A originates an IMS call to callee d and finally the caller tone is played includes:

Step 1101: The caller sends an INVITE message which carries the calling terminal ID, called terminal ID and normal SDP (offer1) of the caller for call setup.

The calling CSCF determines that the caller is an MRBT service subscriber according to the calling terminal ID carried in the INVITE message and the subscription relation between the calling terminal ID and the MRBT service stored in the HSS and routes the call request to the caller tone AS.

Step 1102: The caller tone AS forwards the INVITE message to the called CSCF via the calling CSCF; the called CSCF determines that the callee is an MRBT service subscriber according to the called terminal ID carried in the INVITE message and the subscription relation between the called terminal ID and the MRBT service stored in the HSS and sends the INVITE message carrying the calling terminal ID, called terminal ID, and offer1 to the callee tone AS.

Step 1103: The callee tone AS forwards the INVITE message to the called terminal via the called CSCF.

Steps 1104 and 1105: The called terminal performs normal media negotiation according to its capability and sends a provisional response to the callee tone AS via the called CSCF. The provisional response carries the normal media SDP (answer1) negotiated by the caller and the callee. The response may be a 183 message.

Step 1106: The callee tone AS gets the early media SDP (offer3) of the called MRS for early tone media negotiation between the caller and the called MRS.

Step 1107: The callee tone AS forwards the provisional response to the caller tone AS via the called CSCF and the calling CSCF.

Step 1108: The caller tone AS gets the early media SDP (offer3) of the calling MRS for early tone media negotiation between the caller and the calling MRS.

Step 1109: The caller tone AS sends the provisional response to the calling terminal via the calling CSCF. The provisional response carries answer1, offer2 and offer3.

Steps 1110 and 1111: The calling terminal determines that the caller tone will be played when the callee is d according to the user setting and the terminal ID of callee d and the calling terminal performs early caller tone media negotiation (the negotiated SDP is answer3) and refuses to perform the early callee tone media negotiation. In answer2, the calling terminal port number may be set to 0 or the media direction attribute may be modified to "sendonly".

Step 1112: The calling terminal sends a Prack message to the caller tone AS via the calling CSCF. The message carries the negotiated early caller tone media SDP (answer3) and the early callee tone media SDP (answer2)

Step 1113: The caller tone AS forwards the negotiated early caller tone media SDP (answer3) to the calling MRS.

Step 1114: The caller tone AS sends the Prack message to the callee tone AS via the calling CSCF and the called CSCF. The message carries the early callee tone media SDP (answer2).

Step 1115: The callee tone AS forwards the negotiated early callee tone media SDP (answer2) to the called MRS.

Steps 1116 and 1127: Similar to steps 0115 to 0126.

In embodiments C1 to C11 of the present invention, entities in the network include the caller tone AS, caller tone management system, calling CSCF, calling MRS, calling MRS, callee tone AS, callee tone management system, called CSCF, and called MRS. For easy description, the figures only show a part of the entities.

An entity on the caller side and its counterpart on the callee side may be the same entity. For example, the calling CSCF and the called CSCF may be the same CSCF; the caller tone AS and the callee tone AS may be the same AS; the caller tone management system and the callee tone management system may be the same system. In the embodiments of the present invention, the entities on the caller side and their counterparts on the callee side are different entities. The scenarios where they are the same entities can be understood by analogy.

In practice, the CSCF may not determine whether a user has ordered a tone but instead, the call request is sent directly to the tone AS, which will judge whether the user has ordered a tone and proceed with subsequent operations. This process is similar to but simpler than the processes in the above embodiments.

With the technical solution provided in the embodiments of the present invention, the caller tone service can be implemented in the IMS domain. When both the caller and callee are MRBT service subscribers, the tone AS determines whether to play the caller tone or the callee tone to the caller according to a tone policy.

The caller may also set tone filtering. If both caller and callee tones are ordered, the caller may filter the caller tone and/or the callee tone by configuration. If the callee tone is filtered, the caller tone is played; if the caller tone is filtered, the callee tone is played; if both the caller tone and the callee tone are filtered (so that neither the caller tone or the callee tone is heard), the calling terminal plays a stored multimedia file directly.

The tone filtering policy may be set in the calling terminal, or a tone filtering AS, or a caller tone AS, or an entity accessible to the caller tone AS (such as a tone management system and a network address book of the caller). Particularly, the tone filtering policy may be set in a user setting table like Table 1 with the caller tone. For example, caller A may set a policy as described in Table 3 so that tone filtering (both the caller tone and the callee tone are filtered) is performed when the callee is J or K and the callee tone is played in the case of other callees (equivalent to filtering the caller tone).

TABLE 3

| Condition | Tone Flag | Tone Number |
|---|---|---|
| Callee is B, C, or D | caller-tone | Tone No. 1 |
| Callee is E, F or G | | Tone No. 2 |
| Callee is J or K | filter-tone | |
| Other callees | callee-tone | |

When the caller tone service is unavailable, tone filtering may still be performed based on the callee tone service. The user may set filtering policies with respect to specific callees or specific time segments so as to determine whether to filter the tone.

Figure 21:
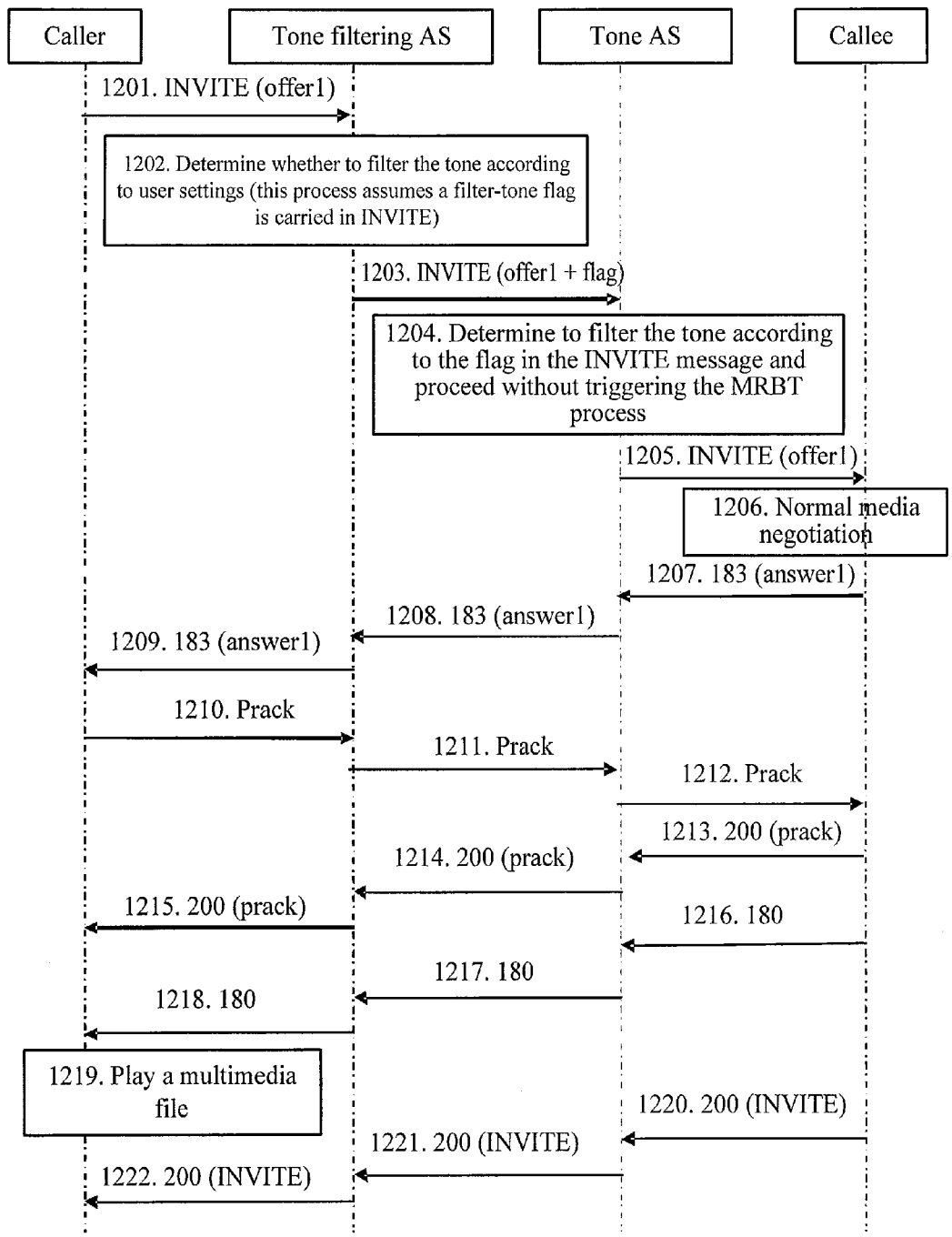
FIG. 21 shows a method for implementing the IMS MRBT filtering service according to embodiment C12 of the present invention.

Embodiment C12 describes a scenario where the caller tone AS and the calling MRS are unnecessary on the caller side. Instead, a tone filtering AS is placed on the caller side and the tone filtering policy is set in the tone filtering AS. The tone filtering AS adds a flag (tone filtering flag) to an INVITE message and the callee tone AS parses the flag to know whether a tone will be played. As shown in FIG. 21, the specific signaling flow in embodiment C12 is as follows:

Step 1201: The caller sends an INVITE message which carries the calling terminal ID, called terminal ID and normal SDP (offer1) of the caller for call setup.

The calling CSCF determines that the caller is an MRBT filtering service subscriber according to the calling terminal ID carried in the INVITE message and the subscription relation between the calling terminal ID and the tone filtering service stored in the HSS and routes the call request to the tone filtering AS.

Step 1202: The tone filtering AS determines whether to filter the tone according to the user settings and the terminal ID of callee B; if the tone is not filtered, the existing call process is followed or else the tone filtering AS adds a "filter-tone" flag to the INVITE message.

Step 1203: The tone filtering AS forwards the INVITE message to the called CSCF via the calling CSCF; the calling CSCF determines that the callee is an MRBT service subscriber according to the called terminal ID carried in the INVITE message and the subscription relation between the called terminal ID and the MRBT service stored in the HSS and sends the INVITE message carrying the calling terminal ID, called terminal ID, offer1 and filter-tone to the callee tone AS.

Steps 1204 and 1205: The callee tone AS determines to filter the tone according to the filter-tone flag carried in the INVITE message and sends the INVITE message to the called terminal via the called CSCF without triggering an MRBT process.

Steps 1206 and 1207: The called terminal performs normal media negotiation according to its capability and sends a provisional response to the callee tone AS via the called CSCF. The provisional response carries the normal media SDP (answer1) negotiated by the caller and the callee. The response may be a 183 message.

Step 1208: The callee tone AS forwards the provisional response to the tone filtering AS via the called CSCF and the calling CSCF.

Step 1209: The tone filtering AS sends the 183 message to the calling terminal via the calling CSCF. The message carries answer1.

Step 1210: The calling terminal sends a Prack message to the tone filtering AS via the calling CSCF.

Steps 1211 and 1212: The tone filtering AS sends the Prack message to the called terminal.

Steps 1213 to 1215: The called terminal sends a response to the calling terminal.

Steps 1216 to 1218: The called terminal rings and sends an alerting signal 180 to the calling terminal.

Step 1219: The calling terminal plays a locally stored multimedia file.

Steps 1220 to 1222: The callee answers and the called terminal sends an off-hook signal 200 to the calling terminal; upon reception of the 200 message, the calling terminal stops playing the local multimedia.

Figure 22:
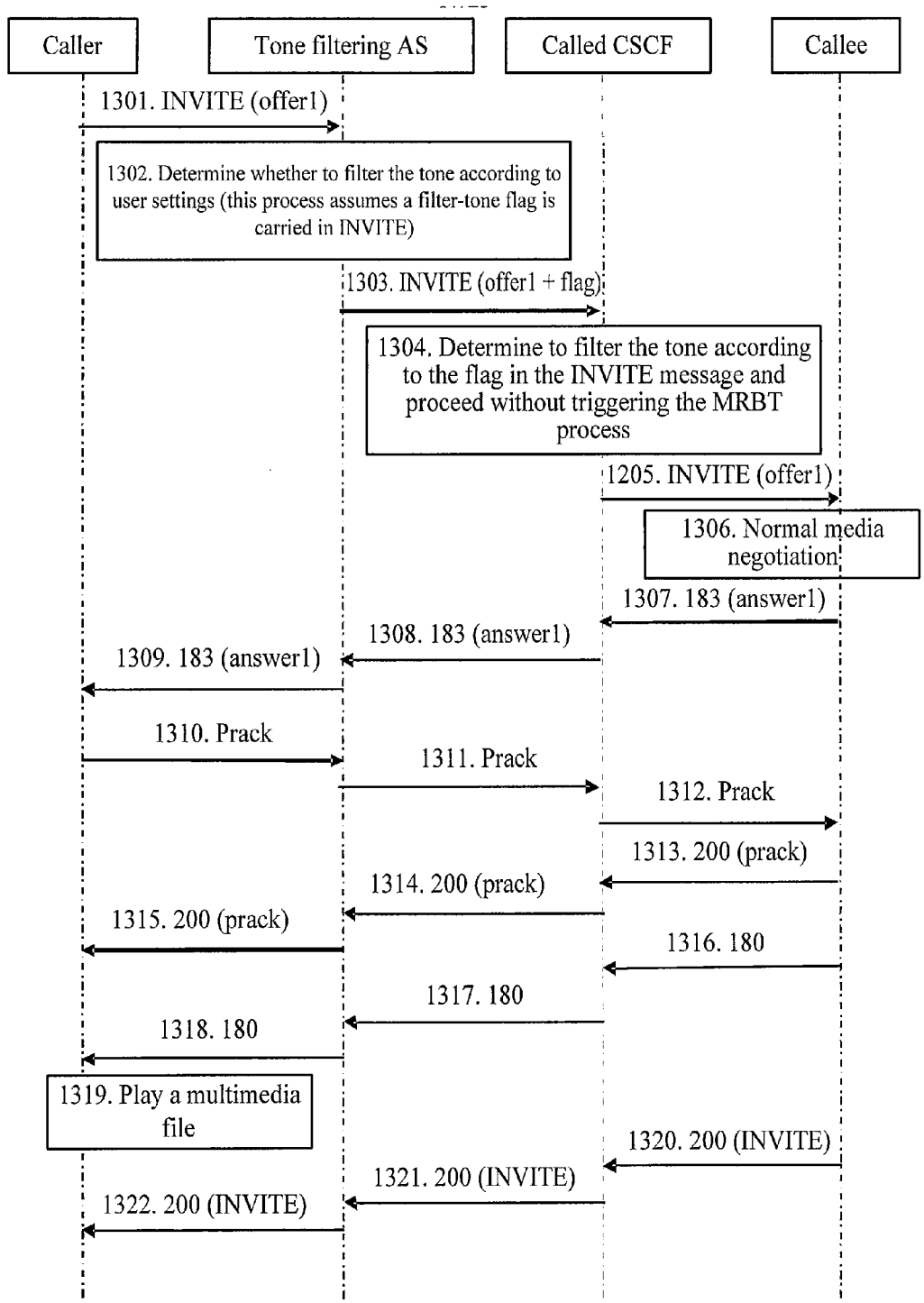
FIG. 22 shows a method for implementing the IMS MRBT filtering service according to embodiment C13 of the present invention.

In the above embodiment, the callee tone AS judges whether to trigger an MRBT process. Optionally, the called CSCF may determine whether to send the call request to the callee tone AS. As shown in FIG. 22, embodiment C13 is different from embodiment C12 in that the called CSCF determines upon reception of the INVITE message to filter the callee tone according to the filter-tone flag carried in the message and forwards the INVITE message to the called terminal directly without sending it to the callee tone AS.

Figure 23:
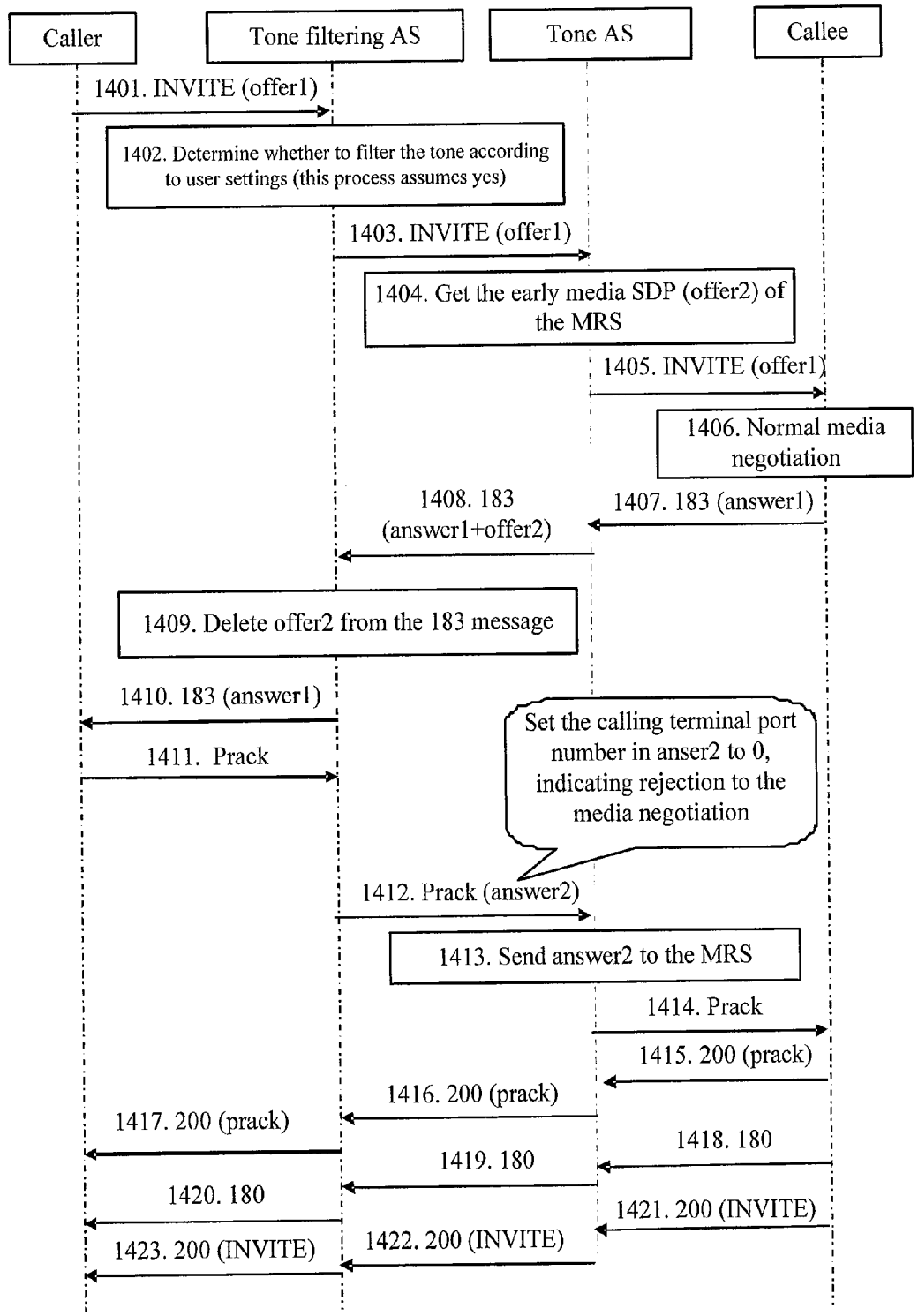
FIG. 23 shows a method for implementing the IMS MRBT filtering service according to embodiment C14 of the present invention.

In another embodiment of the present invention, when the tone filtering AS determines to filter the tone, the tone filtering AS does not add a filter-tone flag to the INVITE message but instead, refuses to perform tone media negotiation or negotiates a part of media types upon reception of the early tone media offer. The specific signaling flow is shown in FIG. 23, including:

Step 1401: Similar to step 1201.

Step 1402: The tone filtering AS determines whether to filter the tone according to user settings and the terminal ID of callee B.

Step 1403: The tone filtering AS routes the INVITE message to the called CSCF via the calling CSCF; the called CSCF determines that the callee is an MRBT service subscriber according to the called terminal ID carried in the INVITE message and the subscription relation between the called terminal ID and the MRBT service stored in the HSS; and the called CSCF forwards the INVITE message to the callee tone AS.

Step 1404: The callee tone AS gets the early media SDP (offer2) of the called MRS.

Step 1405: The callee tone AS sends the INVITE message to the called terminal via the called CSCF. The INVITE message carries the calling terminal ID, called terminal ID, and the normal media SDP (offer1) of the caller for call setup.

Steps 1406 and 1407: The called terminal performs normal media negotiation according to its capability and sends a 183 message to the callee tone AS via the called CSCF. The 183 message carries the normal media SDP (answer1) negotiated by the caller and the callee.

Step 1408: The callee tone AS sends the 183 message to the tone filtering AS via the called CSCF and the calling CSCF. The 183 message carries the normal media SDP (answer1) negotiated by the caller and the callee and the early media SDP (offer2) of the called MRS.

Step 1409: The tone filtering AS determines whether to filter the tone according to user settings and the terminal ID of callee B; if the tone is filtered, the tone filtering AS forwards offer2 in the 183 message to the calling terminal.

Step 1410: The tone filtering AS sends the 183 message to the calling terminal via the calling CSCF. The message carries the normal media SDP (answer1).

Step 1411: The calling terminal sends a Prack message to the tone filtering AS via the calling CSCF.

Step 1412: The tone filtering AS sets the calling terminal port number in answer2 to 0, indicating refusing to perform early tone media negotiation and sends a Prack message that carries answer2 to the tone AS.

Step 1413: The tone AS sends answer2 to the MRS.

Steps 1414 to 1423: Similar to steps 1212 to 1218 and steps 1220 to 1222.

The tone filtering policy may also be set in the calling terminal. When the calling terminal originates a call, the terminal determines whether to filter the tone according to tone filtering policy; if it is necessary to filter the tone, the calling terminal adds a filter-tone flag to the INVITE message or else the flag is not added. Similarly to embodiment C12, the callee tone AS determines to filter the callee tone according to the filter-tone flag in the INVITE message and therefore proceeds without triggering an MRBT process. Similarly to embodiment C13, the called CSCF may determine to filter the callee tone according to the filter-tone flag in the INVITE message and therefore proceed without sending the call request to the tone AS.

In another embodiment of the present invention, the tone filtering policy is set in the calling terminal so that processing on the network is not altered. When the calling terminal receives an early tone media offer, if the calling terminal determines that it is necessary to filter the tone according to the tone filtering policy, the calling terminal refuses to perform the tone media negotiation. Particularly, the calling terminal sets the calling terminal port number in the returned answer2 to 0, or accepts the tone media negotiation but later refuses to open a media channel or refuses to play the tone.

Figure 24:
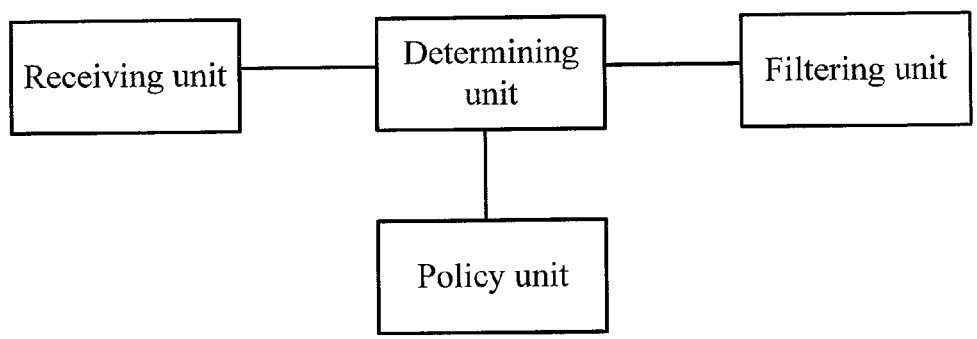
FIG. 24 shows a server provided according to an embodiment of the present invention.

As shown in FIG. 24, a server according to an embodiment of the present invention includes:

a receiving unit, adapted to receive a call request originated by a calling terminal;

a determining unit, adapted to determine whether to filter the tone according to the call request;

a filtering unit, adapted to filter the tone according to the decision; and a policy unit, adapted to store a tone filtering policy according to which the server determines whether to filter the tone.

Figure 25:
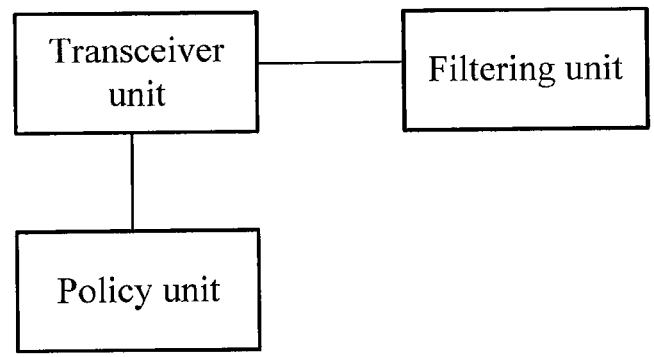
FIG. 25 shows a terminal provided according to an embodiment of the present invention.

As shown in FIG. 25, a terminal according to an embodiment of the present invention includes:

a transceiver unit, adapted to: originate a call request and receive an early tone media negotiation request;

a policy unit, adapted to store a tone filtering policy; and a filtering unit, adapted to: determine whether to filter the tone according to the stored tone filtering policy, and refuse to perform tone media negotiation, or refuse to play the tone, or refuse to open the media channel, according to the decision.

In addition, in the user settings listed in Table 1, the user may further set as follows: if a callee tone is available, choose to receive the callee tone; otherwise receive the caller tone. Because the calling domain does not know whether the callee has ordered a tone, the caller tone AS is unable to determine whether to start an MRBT process when it receives the initial call request. The caller tone AS determines whether a callee tone is ordered according to the response to the call request retuned by the callee side and in particular, according to the SDP type and P-early-media header in the response. Optionally, the callee tone AS adds a tone flag in the response to the call request after an MRBT process is started. Three exemplary embodiments will be described.

Figure 26:
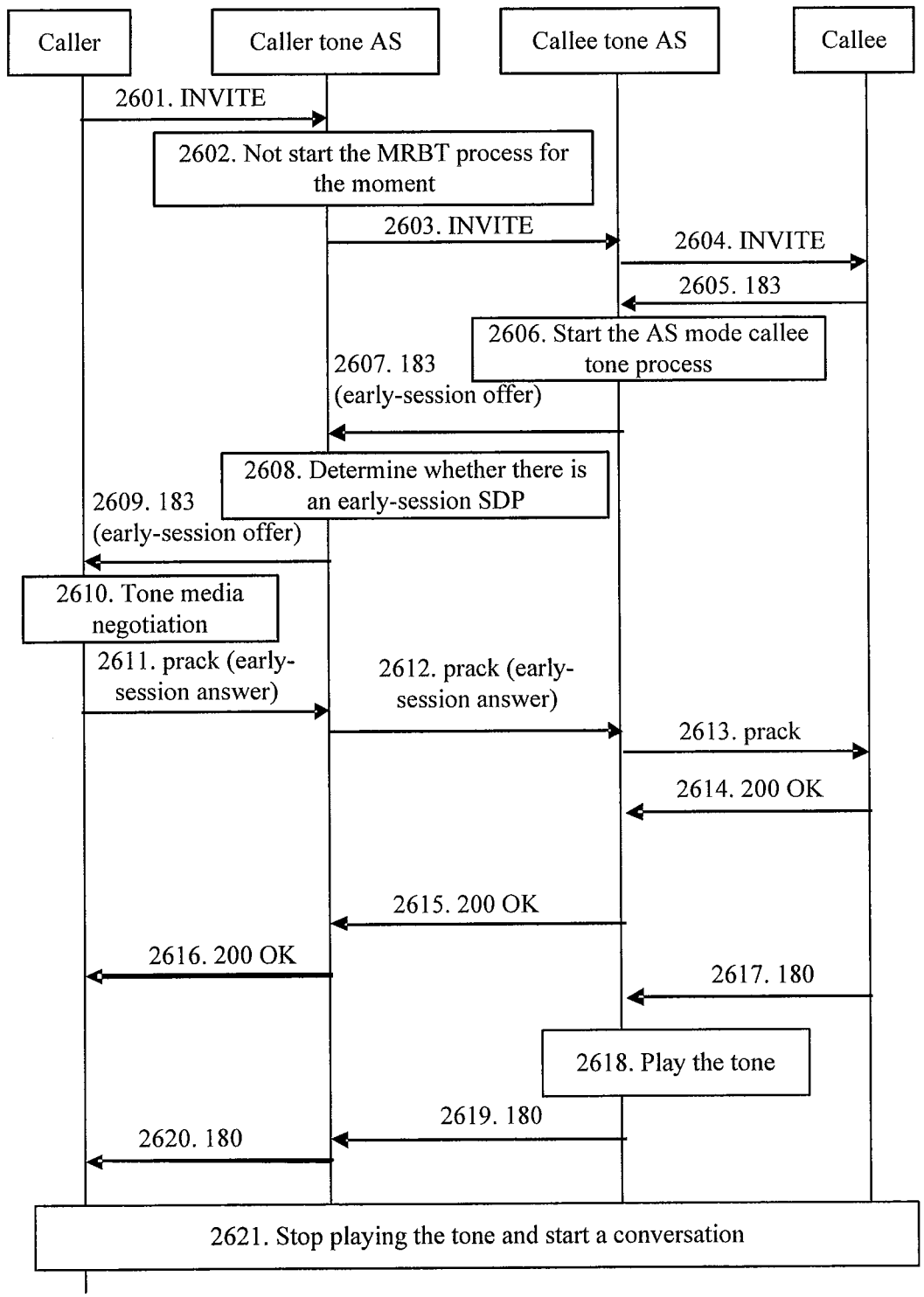
FIG. 26 shows a flowchart of a method for choosing a tone according to an embodiment of the present invention.

In the embodiment shown in FIG. 26, the callee tone AS implements the MRBT service in the AS mode. The process includes:

Step 2601: The caller originates a call request, which is routed to the caller tone AS.

Step 2602: The caller tone AS checks the priority of the caller tone without starting the MRBT process.

Step 2603: If the callee has ordered a callee tone, the call request is routed to the callee tone AS. This embodiment assumes that the callee has ordered a callee tone.

Steps 2604 and 2605: The callee tone AS forwards the call request to the callee and the callee returns a 183 provisional response.

Step 2606: The callee tone AS starts the AS mode callee tone process.

Step 2607: The callee tone AS sends a 183 response that carries the early-session SDP to the caller tone AS.

Step 2608: The caller tone AS determines that a callee tone is available according to the early-session SDP carried in the 183 response and therefore proceeds without starting the caller tone process. If the response does not carry an early-session SDP, the caller tone AS thinks that no callee tone is available and therefore will start the caller tone process.

Steps 2609 to 2616: The callee tone media negotiation is complete.

Step 2617 to 2620: The callee returns a 180 response to the caller and the callee tone AS plays the tone to the caller.

Step 2621: The callee answers; the callee tone AS stops playing the tone; the caller and the callee start a conversation.

Figure 27:
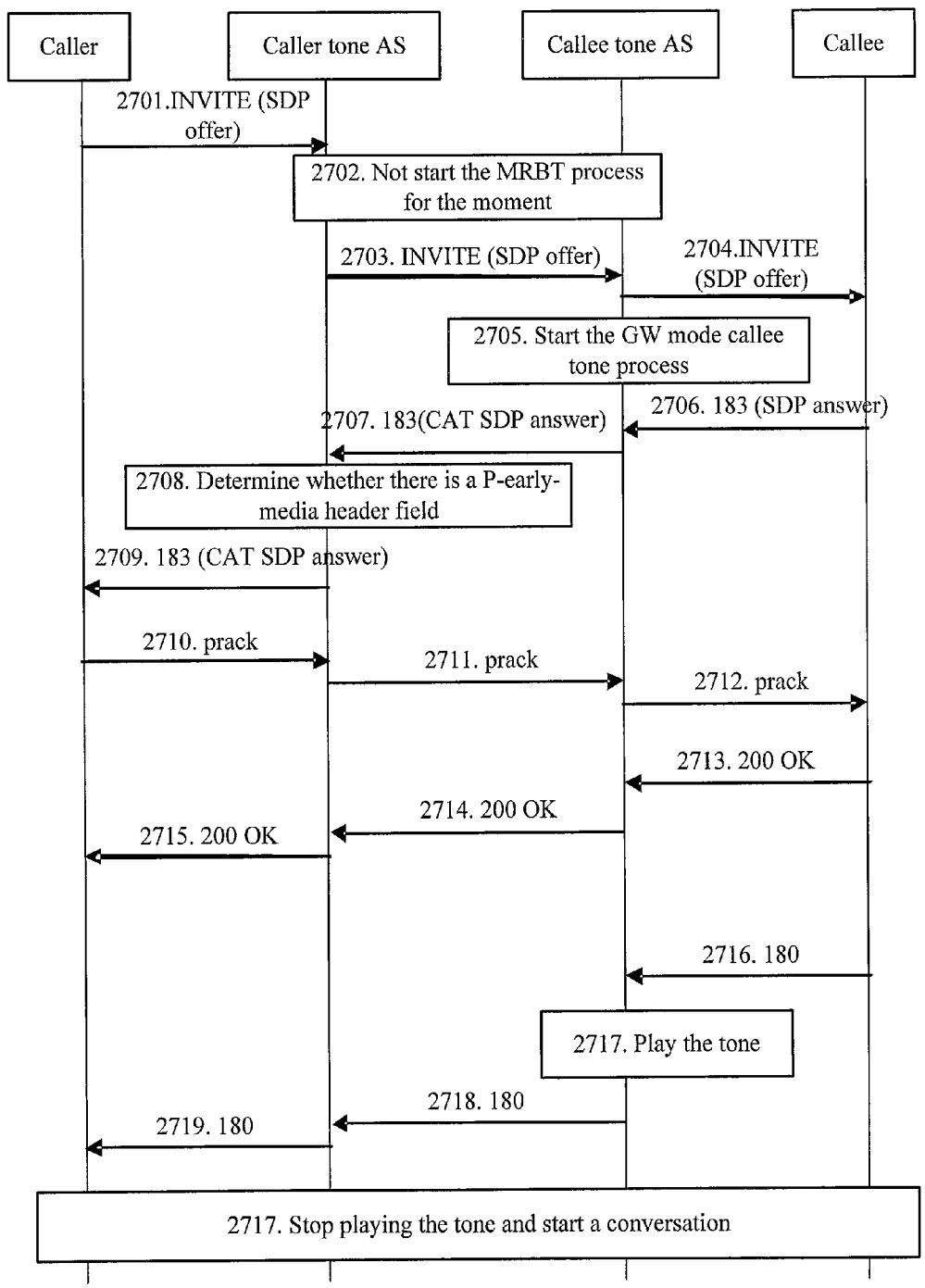
FIG. 27 shows a flowchart of another method for choosing a tone according to an embodiment of the present invention.

In the embodiment shown in FIG. 27, the callee tone AS implements the MRBT service in the gateway mode that supports P-early-media. The process includes:

Step 2701: The caller originates a call request, which is routed to the caller tone AS.

Step 2702: The caller tone AS checks the priority of the caller tone without starting the MRBT process.

Step 2703: If the callee has ordered a callee tone, the call request is routed to the callee tone AS. This embodiment assumes that the callee has ordered a callee tone.

Steps 2704 and 2705: The callee tone AS forwards the call request to the callee and the callee returns a 183 provisional response.

Step 2706: The callee tone AS starts the gateway mode callee tone process.

Step 2707: The callee tone AS sends a 183 response that carries a P-early-media header field to the caller tone AS.

Step 2708: The caller tone AS determines that a callee tone is available according to the P-early-media carried in the 183 response and therefore proceeds without starting the caller tone process. If the response does not carry the P-early-media header field, the caller tone AS thinks that no callee tone is available and therefore will start the caller tone process.

Steps 2709 to 2715: The callee tone media negotiation is complete.

Step 2716 to 2719: The callee returns a 180 response to the caller and the callee tone AS plays the tone to the caller.

Step 2720: The callee answers; the callee tone AS stops playing the tone; the caller and the callee start a conversation.

Figure 28:
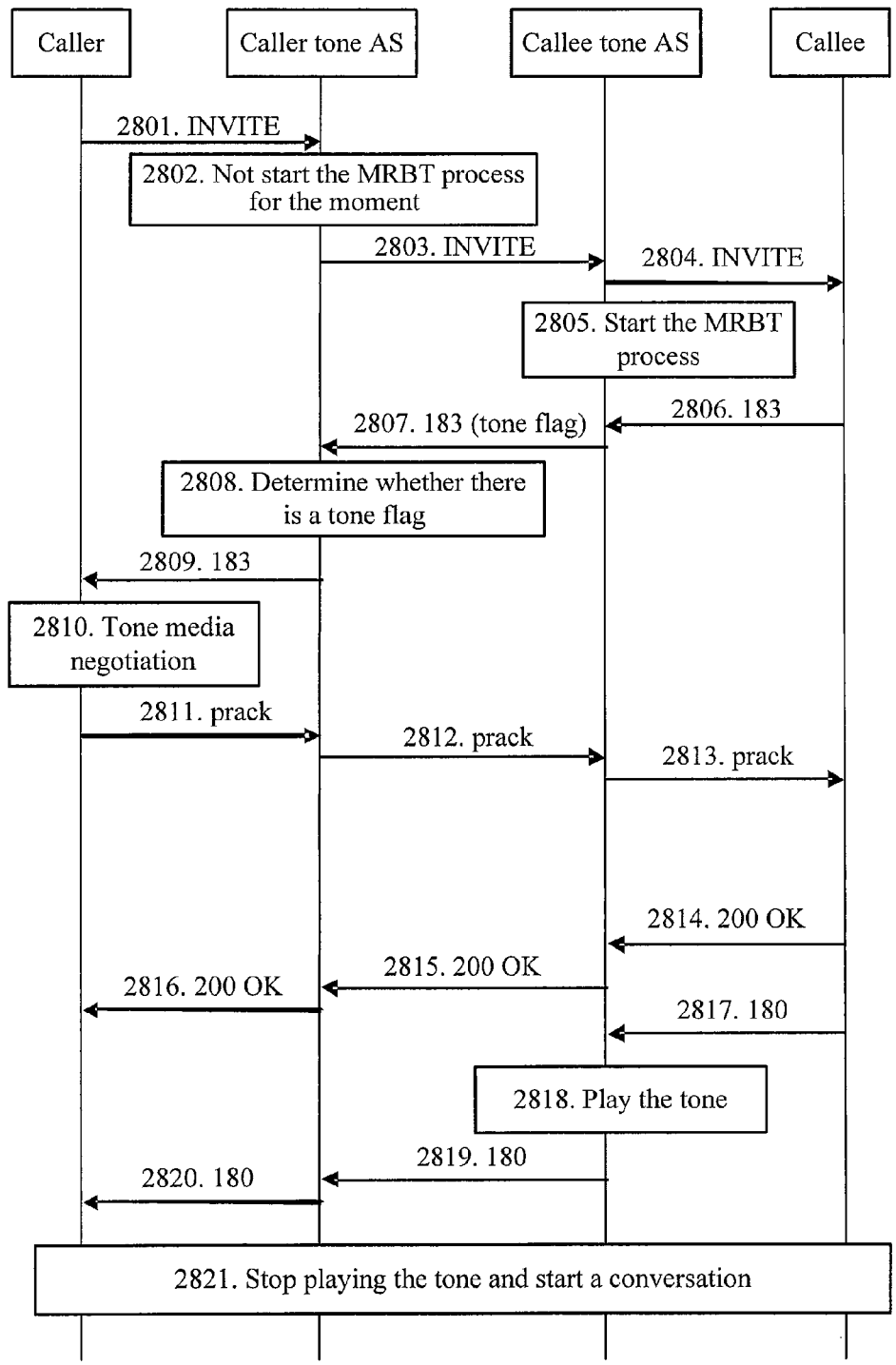
FIG. 28 shows a flowchart of still another method for choosing a tone according to an embodiment of the present invention.

In the embodiment shown in FIG. 28, the callee tone AS adds a tone flag after starting the MRBT process to implement the MRBT service. The process includes:

Step 2801: The caller originates a call request, which is routed to the caller tone AS.

Step 2802: The caller tone AS checks the priority of the caller tone without starting the MRBT process.

Step 2803: If the callee has ordered a callee tone, the call request is routed to the callee tone AS. This embodiment assumes that the callee has ordered a callee tone.

Steps 2804 and 2805: The callee tone AS forwards the call request to the callee and the callee returns a 183 provisional response.

Step 2806: The callee tone AS starts the AS mode callee tone process.

Step 2807: The callee tone AS sends a 183 response that carries a callee-tone flag to the caller tone AS.

Step 2808: The caller tone AS determines that a callee tone is available according to the callee-tone flag carried in the 183 response and therefore proceeds without starting the caller tone process. If no callee-tone flag is carried in the response, the caller tone AS thinks there is not callee tone and therefore will start the caller tone process.

Steps 2809 to 2816: The callee tone media negotiation is complete.

Step 2817 to 2820: The callee returns a 180 response to the caller and the callee tone AS plays the tone to the caller.

Step 2821: The callee answers; the callee tone AS stops playing the tone; the caller and the callee start a conversation.

Figure 29:
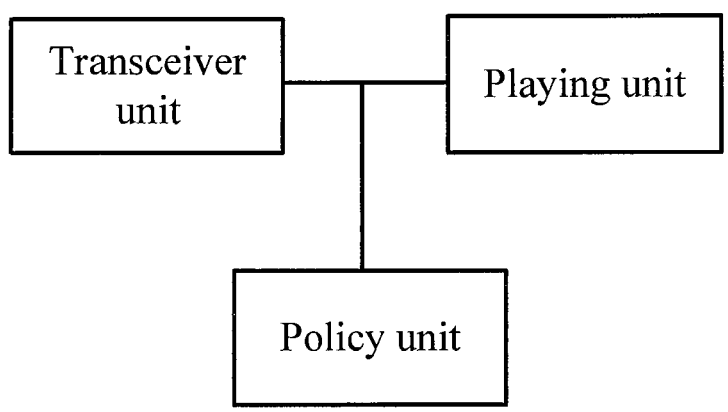
FIG. 29 shows a structure of a tone AS provided according to an embodiment of the present invention.

To implement the above embodiments, a tone AS is provided in an embodiment of the present invention. As shown in FIG. 29, the tone AS includes:

a transceiver unit, adapted to: receive a call request originated by a calling terminal and send the call request to the callee, and receive the response to the call request from the callee.

a policy unit, adapted to store a tone playing policy; and a playing unit, adapted to play the caller tone or the callee tone to the calling terminal according to the tone playing policy and the response message.

To sum up, with the technical solution provided in the embodiments of the present invention, the caller tone service can be implemented in the IMS domain. When both the caller and callee are MRBT service subscribers, the tone AS determines whether to play the caller tone or the callee tone to the caller according to a tone playing policy.

Those skilled in the art understand that all or part of the steps in the methods provided according to the foregoing embodiments of the present invention can be implemented by hardware following instructions of a program. The program may be stored in a computer readable storage medium, such as a Read-Only Memory (ROM), a Random Access Memory (RAM), a magnetic disk and a compact disk.

It is apparent that those skilled in the art can make various modifications and variations to the present invention without departing from the scope of the invention. The invention is intended to cover the modifications and variations provided that they fall in the scope of protection defined by the claims or their equivalents.

What is claimed is:

1. A method for implementing a multimedia ring back tone service, comprising:

receiving, by a caller tone application server, a call request originated by a calling terminal, and forwarding the call request to a callee tone application server;

parsing, by the caller tone application server, a tone playing policy according to the call request, wherein the tone playing policy specifies whether to play a caller tone or a callee tone;

determining, by the caller tone application server, whether to perform a caller tone media negotiation according to the parsing result;

receiving, by the caller tone application server, a call response including an early media Session Description Protocol (SDP) of the callee tone from the callee tone application server;

substituting, by the caller tone application server, an early media SDP of the caller tone for the early media SDP of the callee tone in the received call response when the caller tone media negotiation is determined to be performed;

sending, by the caller tone application server, the received call response which comprises the early media SDP of the caller calling tone to the calling terminal;

instructing, by the caller tone application server, a Media Resource Server (MRS) to play the caller tone to the calling terminal according to the caller tone media negotiation result upon reception of an alerting signal from a called terminal.

2. The method of claim 1, wherein after sending the received call response which comprises the early media SDP of the caller tone to the calling terminal, and before instructing the MRS to play the caller tone to the calling terminal, the method further comprising:

performing, by the caller tone application server, a media negotiation with the callee tone application server on behalf of the calling terminal.

3. The method of claim 2, wherein the performing of the media negotiation with the callee tone application server on behalf of the caller comprising:
sending, by the caller tone application server, a Prack message to the callee tone application server, wherein a calling terminal port number in the Prack message is set to zero or a media direction attribute is modified to "sendonly".

4. The method of claim 2, wherein after sending the received call response which comprises the early media SDP of the caller tone to the calling terminal, and before performing the media negotiation with the callee tone application server on behalf of the calling terminal, the method further comprises:
receiving, by the caller tone application server, a Prack message carrying a negotiated early tone media SDP from the calling terminal;
forwarding, by the caller tone application server, the negotiated early tone media SDP to the MRS.

5. The method of claim 1, wherein after receiving the call request originated by the calling terminal and before substituting the early media SDP of the caller tone for the early media SDP of the callee tone in the received call response, the method further comprises:
sending, by the caller tone application server, the call request to the callee tone application server; and
receiving, by the caller tone application server, the received response which comprises the early media SDP of the callee tone from the callee tone application server.

6. The method of claim 1, wherein the tone playing policy is set in the caller tone application server or in an entity accessible to the caller tone application server.

7. A tone application server, which comprises:
a receiver, configured to receive a call request originated by a calling terminal and a call response from a callee tone application server;
a transmitter, configured to send the call request to the callee tone application server;
a tone policy parsing unit, configured to parse a tone playing policy according to the call request received from the calling terminal, wherein the tone playing policy specifies whether to play a caller tone or a callee tone;
a media negotiating unit, configured to determine whether to perform a caller media negotiation according to the parsing result and to substitute an early media Session Description Protocol (SDP) of the caller tone for an early media SDP of the callee tone in the received call response when the media negotiating unit determines that the caller tone media negotiation is to be performed; and
a unit, configured to instruct a Media Resource Server (MRS) to play the caller tone to the calling terminal according to the caller tone media negotiation result upon reception of an alerting signal from a called terminal.

8. The tone application server of claim 7, wherein the tone application server is further configured to perform a media negotiation with the callee tone application server on behalf of the calling terminal.

9. The tone application server of claim 8, wherein the tone application server is configured to perform media negotiation with the callee tone application server on behalf of the caller, comprises:
the tone application server which is configured to send a Prack message to the callee tone application server, wherein a calling terminal port number in the Prack message is set to zero or a media direction attribute in the Prack message is modified to "sendonly".

10. The tone application server of claim 7, wherein the receiver is configured to receive a Prack message carrying a negotiated early tone media SDP from the calling terminal, and the transmitter is configured to forward the negotiated early tone media SDP to the calling MRS.

11. The tone application server of claim 7, wherein the tone application server further comprises a tone policy configuring unit configured to set the tone playing policy.

12. A system for implementing the multimedia ring back tone service, comprising:
a caller tone application server configured to:
receive a call request originated by a calling terminal;
parse a tone playing policy according to the call request, wherein the tone playing policy specifies whether to play a caller tone or a callee tone;
determine to perform a caller tone media negotiation according to the parsing result;
substitute an early media Session Description Protocol (SDP) of a caller tone for an early media SDP of a callee tone in a received response;
send the received call response which comprises the early media SDP of the calling tone to the calling terminal; and
instruct a Media Resource Server (MRS) to play the caller tone to the calling terminal according to the caller tone media negotiation result upon reception of an alerting signal from a called terminal; and
a callee tone application server configured to receive the call request from the caller tone application server and send the received call response comprising the early media SDP of the callee tone to the caller tone application server.

13. The system of claim 12, wherein the caller tone application server is further configured to perform a media negotiation with the callee tone application server on behalf of the calling terminal.

14. The system of claim 13, wherein the caller tone application server is configured to perform media negotiation with the callee tone application server on behalf of the calling terminal, comprises: the caller tone application server which is configured to send a Prack message to the callee tone application server, wherein a calling terminal port number in the Prack message is set to zero or a media direction attribute in the Prack message is modified to "sendonly".

15. The system of claim 13, wherein the caller tone application server is further configured to receive a Prack message carrying a negotiated early tone media SDP from the calling terminal, and to forward the negotiated early tone media SDP to the MRS.

* * * * *

UNITED STATES PATENT AND TRADEMARK OFFICE
CERTIFICATE OF CORRECTION

| | | |
|---|---|---|
| PATENT NO. | : 8,855,282 B2 | Page 1 of 1 |
| APPLICATION NO. | : 13/619367 | |
| DATED | : October 7, 2014 | |
| INVENTOR(S) | : Lingyan Wu et al. | |

It is certified that error appears in the above-identified patent and that said Letters Patent is hereby corrected as shown below:

<u>On the Title Page</u>

Left column, item (30), line 3 under "Foreign Application Priority Data", before "(CN)" replace "Jul. 4, 2008" with --July 4, 2007--.

Signed and Sealed this
Twenty-second Day of December, 2015

Michelle K. Lee
*Director of the United States Patent and Trademark Office*